(12) United States Patent
Beber et al.

(10) Patent No.: US 9,049,965 B2
(45) Date of Patent: Jun. 9, 2015

(54) FOOD PROCESSING DEVICE WITH AN EXTERNALLY OPERATED ADJUSTMENT MECHANISM

(71) Applicant: Whirlpool Corporation, Benton Harbor, MI (US)

(72) Inventors: Kevin James Beber, Granger, IN (US); Daivd J. Gushwa, Mishawaka, IN (US); Yung Leong Hin, Tuen Mun (HK); Jeffrey Carl Loebig, New Territories (HK); Euan Skinner MacLeod, New Territories (HK); Qu Zhi Jie, Ji An (CN); Michael P. Conti, St. Joseph, MI (US); Thomas Allen Gillette, Stevensville, MI (US); Brent A. Rowland, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 121 days.

(21) Appl. No.: 13/970,778

(22) Filed: Aug. 20, 2013

(65) Prior Publication Data

US 2013/0334352 A1    Dec. 19, 2013

Related U.S. Application Data

(63) Continuation of application No. 14/000,416, filed on Sep. 23, 2013.

(30) Foreign Application Priority Data

Feb. 25, 2011  (WO) ............... PCT/CN2011/000311
Sep. 1, 2011   (WO) ............... PCT/CN2011/001487

(51) Int. Cl.
*B02C 13/02*    (2006.01)
*A47J 43/07*    (2006.01)
(Continued)

(52) U.S. Cl.
CPC .......... *A47J 43/0716* (2013.01); *A47J 43/0722* (2013.01); *A47J 43/04* (2013.01); *A47J 2043/0449* (2013.01)

(58) Field of Classification Search
CPC ..... A47J 43/0722; A47J 43/04; A47J 43/076; A47J 2043/0449
USPC .......................... 241/92, 286, 296, 298, 37.5
See application file for complete search history.

(56) References Cited

U.S. PATENT DOCUMENTS

| 2,189,199 A | 2/1940 | Criner |
| 2,480,717 A | 8/1949 | Dodegge |

(Continued)

FOREIGN PATENT DOCUMENTS

| CN | 1115128 C | 7/2003 |
| CN | 1575716 A | 2/2005 |

(Continued)

OTHER PUBLICATIONS

European Patent Application No. 11859075.1, filing date PCT, Feb. 25, 2011, national phase entry EP Aug. 23, 2013, Applicant: Whirlpool Corporation, European Search Report re: same, mail date Jul. 30, 2014.

(Continued)

*Primary Examiner* — Faye Francis

(57) ABSTRACT

A food processor includes a base and a bowl with a removable lid. Food items are advanced into the bowl through a feed tube formed in the lid where they are cut by a cutting assembly driven by a motor. The cutting assembly is adjustable to vary the thickness of the cut food items. An adjustment assembly positioned in the base is operable to adjust the cutting thickness of the cutting assembly while the cutting assembly is driven by the motor.

20 Claims, 19 Drawing Sheets

(51) Int. Cl.
*A47J 43/04* (2006.01)
*A47J 43/044* (2006.01)

(56) References Cited

U.S. PATENT DOCUMENTS

| | | | |
|---|---|---|---|
| 3,199,860 A | 8/1965 | Moberg | |
| 3,623,525 A | 11/1971 | Kieves | |
| 3,704,736 A | 12/1972 | Pratley | |
| 3,784,118 A | 1/1974 | Hurwitz | |
| 4,190,208 A | 2/1980 | Schaeffer et al. | |
| 4,260,272 A * | 4/1981 | Lebecque | 401/4 |
| 4,369,680 A | 1/1983 | Williams | |
| 4,560,111 A | 12/1985 | Cavalli | |
| 4,570,519 A | 2/1986 | Motosko, II | |
| 4,624,166 A | 11/1986 | Kreth et al. | |
| 4,688,478 A | 8/1987 | Williams | |
| 4,706,896 A | 11/1987 | Moon-Kau | |
| 4,733,589 A | 3/1988 | Wolff | |
| 4,818,116 A | 4/1989 | Pardo | |
| 4,819,882 A | 4/1989 | Stottmann et al. | |
| 4,877,191 A | 10/1989 | Golob et al. | |
| 4,998,677 A | 3/1991 | Gallaher | |
| 5,009,510 A | 4/1991 | Gabriele | |
| 5,037,033 A | 8/1991 | Stottmann et al. | |
| 5,046,252 A | 9/1991 | Ayuta et al. | |
| 5,197,681 A | 3/1993 | Liebermann | |
| 5,577,430 A | 11/1996 | Gunderson et al. | |
| 6,254,019 B1 | 7/2001 | Galbreath | |
| 6,315,226 B1 | 11/2001 | Trick et al. | |
| 6,622,618 B1 * | 9/2003 | Glucksman et al. | 99/495 |
| 7,322,112 B2 | 1/2008 | Boemer | |
| 7,328,864 B2 | 2/2008 | Narai et al. | |
| 7,681,817 B2 | 3/2010 | Orent | |
| 7,694,615 B2 | 4/2010 | Dipietro | |
| 7,866,259 B2 * | 1/2011 | Zaghloul et al. | 99/495 |
| D644,478 S | 9/2011 | Czach | |
| D644,480 S | 9/2011 | Czach et al. | |
| 2006/0075872 A1 | 4/2006 | Wangler | |
| 2006/0150791 A1 | 7/2006 | Chase et al. | |
| 2007/0044621 A1 | 3/2007 | Rote et al. | |
| 2007/0209528 A1 | 9/2007 | Chang | |
| 2007/0261523 A1 | 11/2007 | Hussey et al. | |
| 2008/0115677 A1 | 5/2008 | Tseng | |
| 2008/0156913 A1 | 7/2008 | Orent | |
| 2008/0163768 A1 | 7/2008 | Glucksman et al. | |
| 2009/0139383 A1 | 6/2009 | Tsai | |
| 2009/0158941 A1 | 6/2009 | Lee | |
| 2009/0301319 A1 | 12/2009 | Bigge et al. | |
| 2009/0314168 A1 | 12/2009 | Krasznai | |
| 2011/0139017 A1 | 6/2011 | Beber et al. | |
| 2011/0265664 A1 | 11/2011 | Goncalves et al. | |

FOREIGN PATENT DOCUMENTS

| | | |
|---|---|---|
| CN | 1656989 A | 8/2005 |
| CN | 201101452 Y | 8/2008 |
| CN | 101496699 B | 12/2011 |
| DE | 2116675 A1 | 10/1971 |
| DE | 3644267 A1 | 7/1988 |
| DE | 202004012729 U1 | 2/2005 |
| EP | 010075 A2 | 2/1984 |
| EP | 0244016 A1 | 11/1987 |
| FR | 2500737 A1 | 9/1982 |
| FR | 2582497 | 12/1986 |
| FR | 2582497 A1 | 12/1986 |
| FR | 2602660 | 2/1988 |
| FR | 2646074 A1 | 10/1990 |
| FR | 2862199 A1 | 5/2005 |
| GB | 1264448 | 2/1972 |
| GB | 2075626 A | 11/1981 |
| JP | 1153123 A | 6/1989 |
| JP | 1299522 A | 12/1989 |
| JP | 4099551 A | 3/1992 |
| JP | 4099552 A | 3/1992 |
| KR | 200911969 U | 11/2009 |
| WO | 0019878 A1 | 4/2000 |
| WO | 0221986 A1 | 3/2002 |
| WO | 0230253 A1 | 4/2002 |
| WO | 03057355 A1 | 7/2003 |
| WO | 2006128221 A1 | 12/2006 |
| WO | 2009076585 A1 | 6/2009 |

OTHER PUBLICATIONS

European Patent Application No. 11859310.2, filing date PCT, Sep. 1, 2011, national phase entry EP Aug. 23, 2013, Applicant: Whirlpool Corporation, European Search Report re: same, mail date Jun. 27, 2014.
European Patent Application No. 11859159.3, filing date PCT, Feb. 25, 2011, national phase entry EP Aug. 23, 2013, Applicant: Whirlpool Corporation, European Search Report re: same, mail date Jun. 27, 2014.
International Application No. PCT/CN201001487, filed Sep. 1, 2011, published as WO2012113125A1 on Aug. 30, 2012, Title "A Food Processing Device with An Externally Operated Adjustment Mechanism", Applicant: Whirlpool Corporation.
International Application No. PCT/CN201001487, filed Sep. 1, 2011, published as WO2012113125A1 on Aug. 30, 2012, Title A Food Processing Device with An Externally Operated Adjustment Mechanism, Applicant: Whirlpool Corporation. Written Opinion of the International Search Authority with a mail date of Dec. 8, 2011.
International Application No. PCT/CN2011000311, filed Feb. 25, 2011, published as WO2012113106A1 on Aug. 30, 2012, Title "A Food Processing Device with An Externally Operated Adjustment Mechanism", Applicant: Whirlpool Corporation.
International Application No. PCT/CN2011000311, filed Feb. 25, 2011, published as WO2012113106A1 on Aug. 30, 2012, Title "A Food Processing Device with An Externally Operated Adjustment Mechanism", Applicant: Whirlpool Corporation. Written Opinion of the International Search Authority with a mail date of Nov. 17, 2011.
Wolfgang Puck Professional Series 12-cup Food Processor Use and Care, Jul. 3, 2007, GP. 1-23, W. P. Appliances, Inc. Model WPMFP20C, Rev 1.0, downloaded from: tscdist_foodprocmanual on Apr. 12, 2010.
Ellie; Home Cooking in Montana: Product Review . . . Cuisinart Elite 12 cup Food Processor Model FP-12DC; Mar. 30, 2012; 17 pages.
International Application No. PCT/CN2011000312, filed Feb. 25, 2011, published as WO2012113107A1 on Aug. 30, 2012, Title "A Food Processing Device with Control Buttons Mounted on Lid", Applicant: Whirlpool Corporation.
International Application No. PCT/CN2011000312, filed Feb. 25, 2011, published as WO2012113107A1 on Aug. 30, 2012, Title "A Food Processing Device with Control Buttons Mounted on Lid", Applicant: Whirlpool Corporation. Written Opinion of the International Search Authority with a mail date of Dec. 1, 2011.

* cited by examiner

FOOD PROCESSING DEVICE WITH AN EXTERNALLY OPERATED ADJUSTMENT MECHANISM

This application is a Continuation of U.S. patent application Ser. No. 14/000,416, which was filed on Aug. 20, 2013, which was a continuation-in-part application claiming priority under 35 U.S.C. §119 to PCT International Patent Application No. PCT/CN2011/000311, which was filed on Feb. 25, 2011 and is expressly incorporated herein by reference.

CROSS-REFERENCE TO RELATED U.S. PATENT APPLICATIONS

Cross-reference is made to co-pending U.S. Utility patent application Ser. No. 12/634,766 entitled "FOOD PROCESSOR WITH AN EXTERNAL CONTROL FOR ADJUSTING CUTTING THICKNESS," which was filed by Michael P. Conti et al. on Dec. 10, 2009, and U.S. Design Patent Application Ser. No. 29/386,182 entitled "FOOD PROCESSOR," which was filed by Matthew Czach, each of which is assigned to the same assignee as the present application and each of which is hereby incorporated by reference.

TECHNICAL FIELD

The present disclosure relates generally to a domestic food processing device, and, more particularly, to a food processing device having a control for adjusting the cutting thickness of the food processing device.

BACKGROUND

A food processing device is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool and collect in the bottom of the bowl. Some food processors also include an outlet on the bowl that guides the processed pieces of food into an outside bin, container, or other bowl.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that processed pieces of food cut by the blade fall through the aperture.

SUMMARY

According to one aspect of the disclosure, a food processor includes a base having a motor positioned therein, a removable bowl coupled to the base, and a removable lid coupled to the bowl so as to define a processing chamber. The removable lid has a feed tube that opens into the bowl. The food processor also includes a cutting assembly positioned in the processing chamber that is driven by the motor to cut food items advanced through the feed tube. The cutting assembly is positionable between a plurality of cutting positions to produce cut food items of varying thicknesses. The food processor also includes an adjustment assembly positioned in the base. The adjustment assembly includes a first sleeve secured to the base, a second sleeve rotatively coupled to the first sleeve, and a user-operated control device operable to rotate the second sleeve relative to the first sleeve to move the cutting assembly between the plurality of cutting positions. In some embodiments, the first sleeve may have an externally-threaded body, and the second sleeve may have an internally-threaded body positioned over the externally-threaded body of the first sleeve.

In some embodiments, the cutting assembly may include a cutting blade and a rotating disk that may be supported by the second sleeve. In some embodiments, rotation of the second sleeve in a first direction may cause upward movement of the second sleeve and the rotating disk relative to the cutting blade, and rotation of the second sleeve in a second direction may cause downward movement of the second sleeve and the rotating disk relative to the cutting blade.

Additionally, in some embodiments, the food processor may further include a drive shaft connected at a first end to the motor and at a second end to the cutting assembly to transmit a driving force from the motor to the cutting assembly. In some embodiments, the first sleeve may include a bearing rotatively supporting the drive shaft, and the drive shaft may extend through an opening defined in the second sleeve. The opening may be sized such that the drive shaft does not contact the second sleeve.

In some embodiments, the food processor may further include a first adaptor removably coupled to the rotating disk, and a second adaptor secured to a lower end of the first adaptor. The second sleeve may include a bearing rotatively supporting the second adaptor. In some embodiments, the lower end of the first adaptor may include a first plurality of teeth, and the second adaptor may include a second plurality of teeth interdigitated with the first plurality of teeth to secure the second adaptor to the first adaptor.

Additionally, in some embodiments, the adjustment assembly may further comprise a gear assembly positioned in the base and coupled to the second sleeve. The gear assembly may be operable to rotate the second sleeve relative to the first sleeve. The user-operated control device may be coupled to the gear assembly and be configured to operate the gear assembly such that the second sleeve is rotated relative to the first sleeve to move the cutting assembly between the plurality of cutting positions.

In some embodiments, the second sleeve may have a groove defined therein. The gear assembly may have a first gear including a first plurality of teeth defined on an outer surface and a spline extending from an inner surface thereof. The spline may be received in the groove of the second sleeve. A second gear including a second plurality of teeth may be interdigitated with the first plurality of teeth. The user-operated control device may cause rotation of the second gear and the first gear.

In some embodiments, the user-operated control device may include a lever extending outwardly from the base and positionable between a plurality of adjustment positions relative to the base. The lever may be coupled to the second gear such that movement of the lever between the plurality of adjustment positions device may cause rotation of the second sleeve relative to the first sleeve to move the cutting assembly between the plurality of cutting positions.

In some embodiments, the food processor may further include a locking mechanism to inhibit movement of the lever. Additionally, in some embodiments, the locking mechanism may include a plurality of notches formed in the second gear, and each notch may correspond to one of the plurality of adjustment positions. The locking mechanism may also include a pin positioned below the second gear that is configured to be received in each of the plurality of notches, and a spring coupled to the pin. The spring may bias the pin into the notch corresponding to a present adjustment position of the lever to inhibit movement of the lever.

According to another aspect, the food processor includes a base having a motor positioned therein, a removable bowl coupled to the base, and a removable lid coupled to the bowl so as to define a processing chamber. The lid has a feed tube that opens into the bowl. The food processor also includes a cutting assembly, which is positioned in the processing chamber and driven by the motor to cut food items advanced through the feed tube. The cutting assembly includes a cutting blade and a rotating disk having an upper surface. The rotating disk is upwardly and downwardly moveable relative to the cutting blade to adjust the distance between the upper surface of the rotating disk and the cutting blade. The food processor also has an adjustment assembly including a screw-type drive assembly positioned in the base. The screw-type drive assembly is operable to move the rotating disk relative to the cutting blade while the rotating disk and the cutting assembly is driven by the motor.

In some embodiments, the screw-type drive assembly may support the rotating disk. Rotation of the screw-type drive assembly in a first direction may cause upward movement of the rotating disk, and rotation of the screw-type drive assembly in a second direction may cause downward movement of the rotating disk.

In some embodiments, the screw-type drive assembly may include an externally-threaded first sleeve and an internally-threaded second sleeve positioned over the first sleeve. The rotating disk may be supported by the second sleeve such that rotation of the second sleeve in the first direction nay cause upward movement of the second sleeve and the rotating disk and rotation of the second sleeve in the second direction may cause downward movement of the second sleeve and the rotating disk.

In some embodiments, the adjustment assembly may further include a gear assembly positioned in the base and coupled to the second sleeve. The gear assembly may be configured to rotate the second sleeve relative to the first sleeve. Additionally, in some embodiments, the adjustment assembly may further include a lever coupled to the screw-type drive assembly. The lever may extend outwardly from the base and be moveable relative to the base, and movement of the lever may cause the screw-type drive assembly to move the rotating disk relative to the cutting blade. In some embodiments, the food processor may include a locking mechanism to inhibit movement of the lever.

According to another aspect, the food processor includes a base having a motor positioned therein, a removable bowl coupled to the base, and a removable lid coupled to the bowl so as to define a processing chamber. The lid has a feed tube that opens into the bowl. A cutting assembly is positioned in the processing chamber and driven by the motor to cut food items advanced through the feed tube. The cutting assembly is positionable between a plurality of cutting positions to produce cut food items of varying thicknesses. An adjustment assembly is positioned in the base that is operable to move the cutting assembly between the plurality of cutting positions while the cutting assembly is driven by the motor.

In some embodiments, the adjustment assembly may include a lever extending outwardly from the base. The lever may be positionable between a plurality of adjustment positions corresponding to the plurality of cutting positions of the cutting assembly such that movement of the lever between the plurality of adjustment positions moves the cutting assembly between the plurality of cutting positions. In some embodiments, the adjustment assembly may include a screw-type drive assembly operable to move the cutting assembly between the plurality of cutting positions, and a second motor rotatively coupled to the screw-type drive assembly. The second motor may be configured to operate the screw-type drive assembly to move the cutting assembly between the plurality of cutting positions when the second motor is energized.

According to another aspect, a food processor includes a base having a motor positioned therein, a bowl removably coupled to the base, and a lid removably coupled to the bowl so as to define a processing chamber. The lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor includes an adjustment assembly that is operable to move the cutting assembly between the plurality of cutting positions while the cutting assembly is driven by the motor. The adjustment assembly includes a sleeve rotatively coupled to the base, a gear assembly positioned in the base and operable to rotate the sleeve, and a user-operated control device configured to operate the gear assembly to rotate the sleeve. In the food processor, rotation of the sleeve causes the cutting assembly to move between the plurality of cutting positions while the cutting assembly is driven by the motor.

In some embodiments, the user-operated control device may include a control knob having a grip and a shaft extending inwardly from the control knob into the base.

In some embodiments, the cutting assembly may include a cutting blade and a rotating disk. Rotation of the sleeve in a first direction may cause upward movement of the rotating disk relative to the cutting blade, and rotation of the sleeve in a second direction may cause downward movement of the rotating disk relative to the cutting blade.

Additionally, in some embodiments, the gear assembly may include a first gear including a first plurality of teeth, and the first gear may be moveably coupled to the sleeve such that rotation of the first gear causes rotation of the sleeve. The gear assembly may also include a second gear including a second plurality of teeth interdigitated with the first plurality of teeth such that rotation of the second gear causes rotation of the first gear. In some embodiments, the first gear may be a worm gear.

In some embodiments, the user-operated control device may include a grip formed on the second gear, and the grip may be operable by a user to rotate the second gear.

In some embodiments, the user-operated control device may include a ring having a third plurality of teeth defined on an inner surface. The third plurality of teeth may be interdigitated with a number of the second plurality of teeth such that rotation of the ring causes rotation of the second gear. In some embodiments, the bowl may include a lower rim and the ring may be rotatively coupled to the lower wall of the bowl. In some embodiments, the ring may have a grip formed thereon that is operable by a user to rotate the ring.

Additionally, in some embodiments, the food processor may also include a drive shaft configured to transmit a driving force from the motor to the cutting assembly. The drive shaft may extend through an opening defined in the sleeve, and the opening may be sized such that the sleeve is spaced apart from the drive shaft.

In some embodiments, the user-operated control device may include a lever extending outwardly from the base and moveable relative to the base. The lever may be coupled to the gear assembly such that movement of the lever relative to the base causes the gear assembly to rotate the sleeve.

According to another aspect, the food processor includes a base having a motor positioned therein, a bowl removably coupled to the base, and a lid removably coupled to the bowl so as to define a processing chamber. The lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor also includes an adjustment assembly having a user-operated control device that is operable to move the cutting assembly between the plurality of cutting positions while the cutting assembly is driven by the motor. The user-operated control device includes a shaft extending outwardly from the base and a control knob coupled to the shaft, and rotation of the control knob causes the cutting assembly to move between the plurality of cutting positions while the cutting assembly is driven by the motor.

In some embodiments, the adjustment assembly may include a gear assembly located in the base that is operable to move the cutting assembly between the plurality of cutting positions. Rotation of the control knob may cause the gear assembly to move the cutting assembly between the plurality of cutting positions.

In some embodiments, the adjustment assembly may further include an adaptor having a first end coupled to the cutting assembly, and a sleeve rotatively coupled to the base and to a second end of the adaptor. The sleeve may have an inner surface with a groove defined therein. The gear assembly of the food processor may include a first gear including a first plurality of teeth defined on an outer surface and a spline extending from an inner surface. The spline may be received in the groove of the sleeve such that rotation of the first gear causes rotation of the sleeve.

In some embodiments, the gear assembly may include a rack and pinion configured to translate rotation of the control knob into rotation of the first gear. In some embodiments, the rack may include a second plurality of teeth interdigitated with the first plurality of teeth of the first gear. Additionally, in some embodiments, the control knob may be secured to a first end of the shaft and the pinion may be secured to a second end of the shaft. The pinion may include a third plurality of teeth interdigitated with a fourth plurality of teeth defined on the rack.

In some embodiments, the first gear may be a worm gear and the gear assembly may include a second gear including a second plurality of teeth interdigitated with a number of the first plurality of teeth of the worm gear.

In some embodiments, the cutting assembly may include a cutting blade and a rotating disk, and rotation of the control knob in a first direction may cause upward movement of the rotating disk relative to the cutting blade, and rotation of the control knob in a second direction may cause downward movement of the rotating disk relative to the cutting blade.

According to another aspect, a food processor includes a base having a motor positioned therein, a bowl removably coupled to the base, and a lid removably coupled to the bowl so as to define a processing chamber. The lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor also includes an adjustment assembly that has a gear assembly positioned in the base and a user-operated control device. The gear assembly is operable to move the cutting assembly between the plurality of cutting positions while the cutting assembly is driven by the motor. The user-operated control device includes a thumbwheel positioned in a slot defined in the base. The thumbwheel is configured to operate the gear assembly to move the cutting assembly.

According to another aspect, a food processor includes a base having a motor positioned therein, a bowl removably coupled to the base, and a lid removably coupled to the bowl so as to define a processing chamber. The bowl is configured to rotate relative to the base about an axis, and the lid has a feed tube that opens into the bowl. The food processor also includes a cutting assembly positioned in the processing chamber and driven by the motor to cut food items advanced through the feed tube. The cutting assembly includes a cutting blade and a rotating disk having an upper surface. The rotating disk is moveable relative to the cutting blade to adjust a distance defined between the upper surface of the rotating disk and the cutting blade. The food processor also includes an adjustment assembly positioned in the base. The adjustment assembly is operable to move the rotating disk relative to the cutting blade while the cutting assembly is driven by the motor. The bowl is configured to engage the adjustment assembly such that rotation of the bowl in a first direction about the axis causes upward movement of the rotating disk relative to the cutting blade, and rotation of the bowl in a second direction causes downward movement of the rotating disk relative to the cutting blade.

In some embodiments, the adjustment assembly may include an adaptor coupled to the rotating disk, a sleeve rotatively coupled to the adaptor and to the base, and a gear assembly positioned in the base. The gear assembly may be configured to translate rotation of the bowl into rotation of the sleeve. Rotation of the sleeve may cause movement of the rotating disk relative to the cutting blade.

In some embodiments, the sleeve may have a groove defined therein. The gear assembly may include a first gear including a first plurality of teeth defined on an outer surface and a spline extending from an inner surface. The spline may be received in the groove of the sleeve such that rotation of the first gear causes rotation of the sleeve. The gear assembly may also include a second gear including a second plurality of teeth interdigitated with the first plurality of teeth such that rotation of the second gear causes rotation of the first gear.

Additionally, in some embodiments, the bowl may include a third plurality of teeth that are interdigitated with a number the second plurality of teeth of the second gear such that rotation of the bowl about the axis causes rotation of the second gear. In some embodiments, the bowl may include an inner wall and an arm extending inwardly from the inner wall to a first end. The first end of the arm may have the third plurality of teeth defined thereon.

In some embodiments, the base may have a slot defined therein sized to receive the first end of the arm. Additionally, in some embodiments, the slot may include a first section in which the bowl is engaged with the adjustment assembly and a second section in which the bowl is disengaged with the adjustment assembly.

In some embodiments, the food processor may further include a drive shaft configured to transmit a driving force from the motor to the cutting assembly, and the drive shaft may extend through an opening defined in the sleeve. The opening may be sized such that the sleeve is spaced apart from the drive shaft. Additionally, in some embodiments, the food processor may include a drive stem coupled to the drive shaft. The cutting assembly may further include a blade carrier having the cutting blade secured thereto, and the drive stem may have a keyed end that is received in a corresponding socket defined in the blade carrier. In some embodiments, the lid may include a sleeve that contacts an upper end of the blade carrier to position the blade carrier on the drive stem.

In some embodiments, the food processor may further include a locking mechanism configured to inhibit rotation of the bowl about the axis. In some embodiments, the locking mechanism may include a pin extending from a lower surface of the bowl, and a plurality of notches defined in an upper surface of base. Each notch may be sized to receive the pin of the bowl.

According to another aspect, a food processor includes a base having a motor positioned therein, a bowl removably coupled to the base, and a lid removably coupled to the bowl so as to define a processing chamber. The bowl is configured to rotate relative to the base about an axis, and the lid has a feed tube that opens into the bowl. The food processor also includes a cutting assembly positioned in the processing chamber and driven by the motor to cut food items advanced through the feed tube. The cutting assembly is positionable between a plurality of cutting positions to produce cut food items of varying thicknesses. The food processor includes an adjustment assembly attached to the base. The adjustment assembly is operable to move the cutting assembly between the plurality of cutting positions while the cutting assembly is driven by the motor. The bowl is configured to engage the adjustment assembly such that rotation of the bowl about the axis operates the adjustment assembly to move the cutting assembly between the plurality of cutting positions.

In some embodiments, the adjustment assembly may include an adaptor coupled to the cutting assembly, a sleeve rotatively coupled to the adaptor and to the base, and a gear rotatively coupled to the base. The gear may be configured to translate rotation of the bowl into rotation of the sleeve, and rotation of the sleeve may cause movement of the cutting assembly between the plurality of cutting positions.

In some embodiments, the sleeve may have a groove defined therein, and the gear may include a first plurality of teeth defined on an outer surface and a spline extending from an inner surface. The spline may be received in the groove of the sleeve such that rotation of the gear causes rotation of the sleeve, and the bowl may include a second plurality of teeth that are interdigitated with the first plurality of teeth such that rotation of the bowl causes rotation of the gear.

In some embodiments, the adaptor may include a first adaptor removably coupled to the cutting assembly and a second adaptor torsionally secured to a lower end of the first adaptor. The sleeve may include a bearing rotatively supporting the second adaptor. Additionally, in some embodiments, the lower end of the first adaptor may include a first plurality of teeth. The second adaptor may include a second plurality of teeth interdigitated with the first plurality of teeth to torsionally secure the second adaptor to the first adaptor.

In some embodiments, the gear may be a first gear moveably coupled to the sleeve such that rotation of the first gear causes rotation of the sleeve. The first gear may include a first plurality of teeth, and the adjustment assembly may further include a second gear including a second plurality of teeth interdigitated with the first plurality of teeth such that rotation of the second gear causes rotation of the first gear.

In some embodiments, the bowl may include an inner wall and an arm extending inwardly from the inner wall to a first end. The first end of the arm may have a third plurality of teeth defined thereon that are interdigitated with the second plurality of teeth of the second gear such that rotation of the bowl about the axis causes rotation of the second gear.

According to another aspect, a food processor includes a base having a motor positioned therein, a bowl removably coupled to the base, and a lid removably coupled to the bowl so as to define a processing chamber. The bowl is configured to rotate about an axis relative to the base, and the lid has a feed tube that opens into the bowl. A cutting assembly is positioned in the processing chamber and driven by the motor to cut food items advanced through the feed tube. The cutting assembly is positionable between a plurality of cutting positions to produce cut food items of varying thicknesses. The food processor also includes an adjustment assembly having a gear assembly positioned in the base, and the gear assembly is operable to move the cutting assembly between the plurality of cutting positions while the cutting assembly is driven by the motor. The bowl is configured to engage the gear assembly such that rotation of the bowl about the axis relative to the base operates the adjustment assembly to move the cutting assembly between the plurality of cutting positions.

BRIEF DESCRIPTION OF THE DRAWINGS

The detailed description particularly refers to the following figures, in which.

DETAILED DESCRIPTION OF THE DRAWINGS

Figure 1:
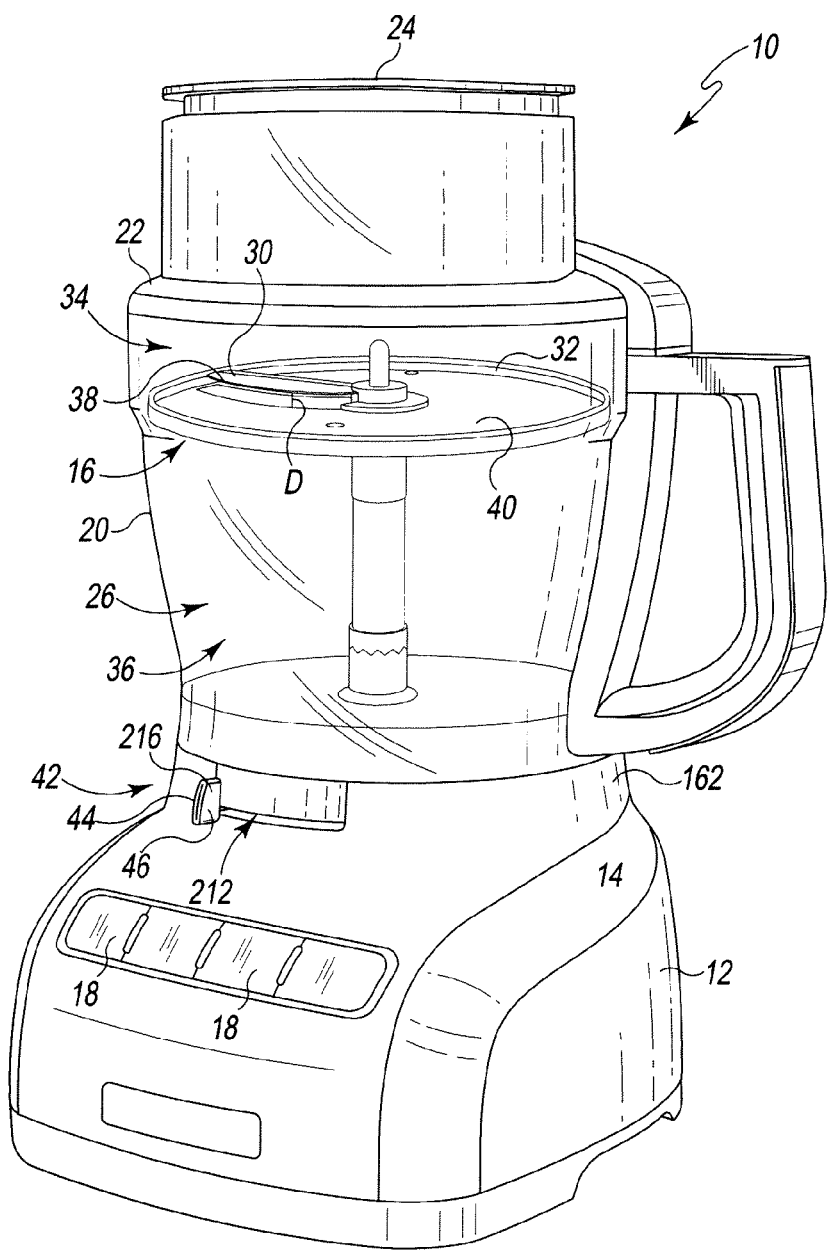
FIG. 1 is a perspective view of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a food processing device or food processor 10 is shown. The food processor 10 has a base 12 that houses a motor 14 and a control unit. Under the control of the control unit, the motor 14 drives a cutting assembly 16 to cut food items such as cheeses, meats, fruits, and vegetables. The base 12 also includes one or more buttons, switches, dials, or other types of controls 18. A user operates the controls 18 to control the operation of the motor 14 and hence the food processor 10. For example, one of the controls 18 may be operable to turn the motor 14 on and off while another control 18 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable receptacle or bowl 20 is secured to the base 12. The bowl's handle facilitates placement of the bowl 20 on the base 12. The bowl 20 includes a removable lid 22 secured to its upper peripheral edge. The lid 22 has a feed tube 24 formed thereon through which food items such as fruits and vegetables are inserted into the bowl 20 to be processed by the food processor 10. Collectively, the lid 22 and the bowl 20 define a processing chamber 26 where food items are processed by the cutting assembly 16.

The bowl 20, lid 22, and feed tube 24 are generally made of a transparent or translucent plastic material so that the contents of the food processor 10 can be viewed by a user without removing the lid 22 from the bowl 20. Moreover, one or more locking mechanisms may be used to lock the bowl to the base 12 and the lid 22 to the bowl 20.

As shown in FIG. 1, the cutting assembly 16 includes a cutting blade 30 and a rotating disk 32, which effectively divides the processing chamber 26 into an upper compartment 34 located between the disk 32 and the lid 22, and a lower compartment 36 located underneath the disk 32. A vertical distance, D, between the cutting edge 38 of the cutting blade 30 and the upper surface 40 of the rotating disk 32 defines a cutting thickness of food items processed by the cutting assembly 16. In other words, the thickness of the pieces of food items cut by the food processor 10 is determined by the distance D between the cutting edge 38 of the cutting blade 30 and the upper surface 40 of the rotating disk 32. As the distance D between the cutting edge 38 of the cutting blade 30 and the upper surface 40 of the rotating disk 32 increases, thicker pieces of food items are created; while thinner pieces of food items are created when the distance D between the cutting edge 38 of the cutting blade 30 and the upper surface 40 of the rotating disk 32 decreases. The cutting assembly 16 has a number of cutting positions in which the distance D between the cutting edge 38 of the cutting blade 30 and the upper surface 40 of the rotating disk 32 is preset.

A thickness adjustment assembly 42 is operable by a user to vary the cutting thickness of the food processor 10 while the cutting assembly 16 is driven by the motor 14, thereby creating thicker or thinner pieces of cut food items during a cutting operation. The adjustment assembly 42 includes a user-operated control device 44 that is located outside of the processing chamber 26 defined by the bowl 20 and the lid 22. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the cutting thickness of the food processor to be adjusted while the cutting assembly 16 is driven by the motor 14.

For example, in the illustrative embodiment described herein, the external control device 44 is embodied as a control lever 46 that extends outwardly from the base 12 and is moveable relative to the base 12 to change the cutting thickness of the cutting assembly 16 without removing the lid 22 from the bowl 20. In such a configuration, the user moves the control lever 46 one direction or the other to change (i.e., increase or decrease) the distance D between the cutting edge 38 of the cutting blade 30 and the upper surface 40 of the rotating disk 32. It should be appreciated that other user-operated control devices, such as knobs, dials, buttons, servomotors, or the like, may be substituted for the control lever 46.

Figure 2:
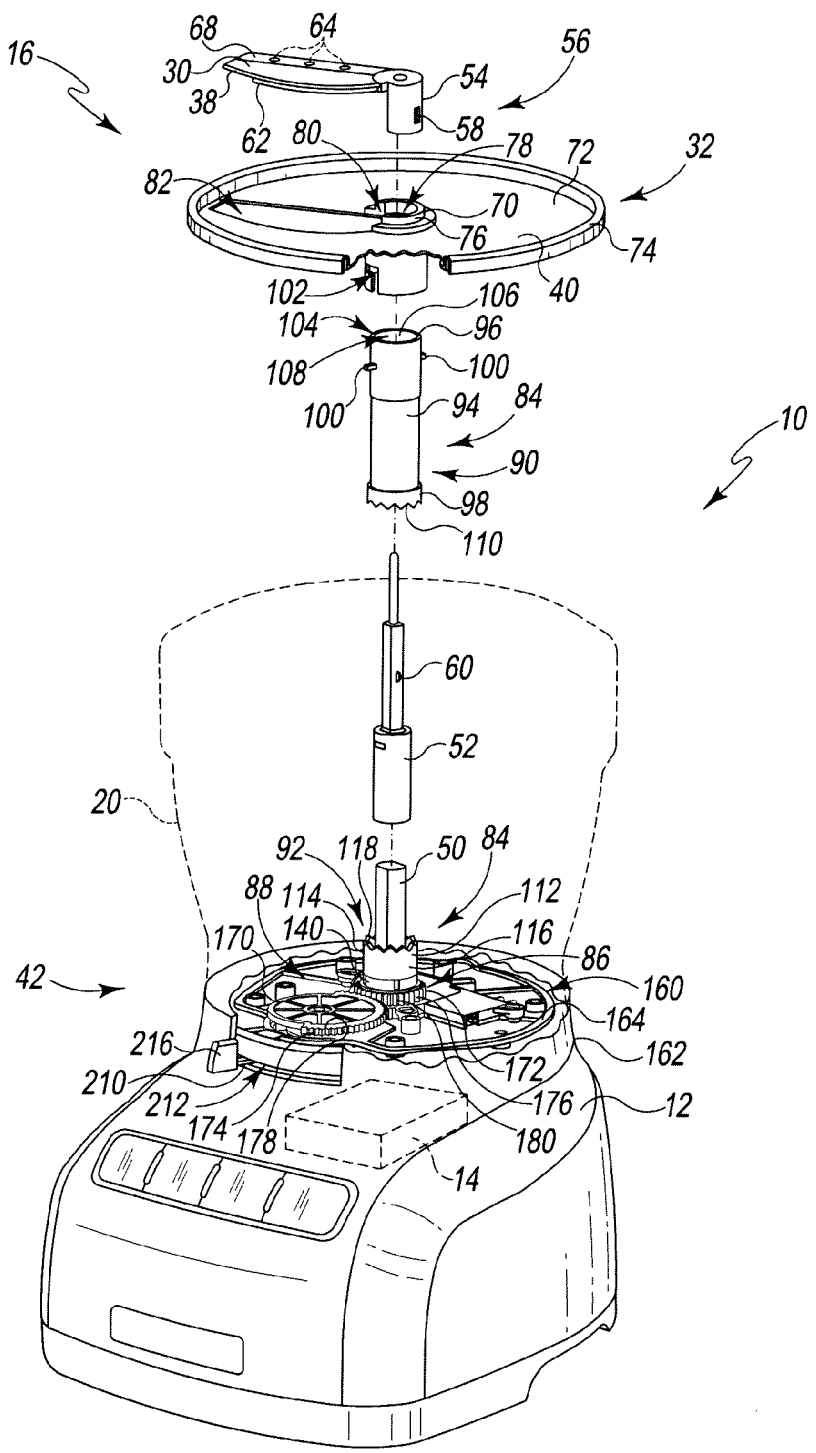
FIG. 2 is an exploded, partial cross-sectional perspective view of the food processor of FIG. 1.
Figure 3:
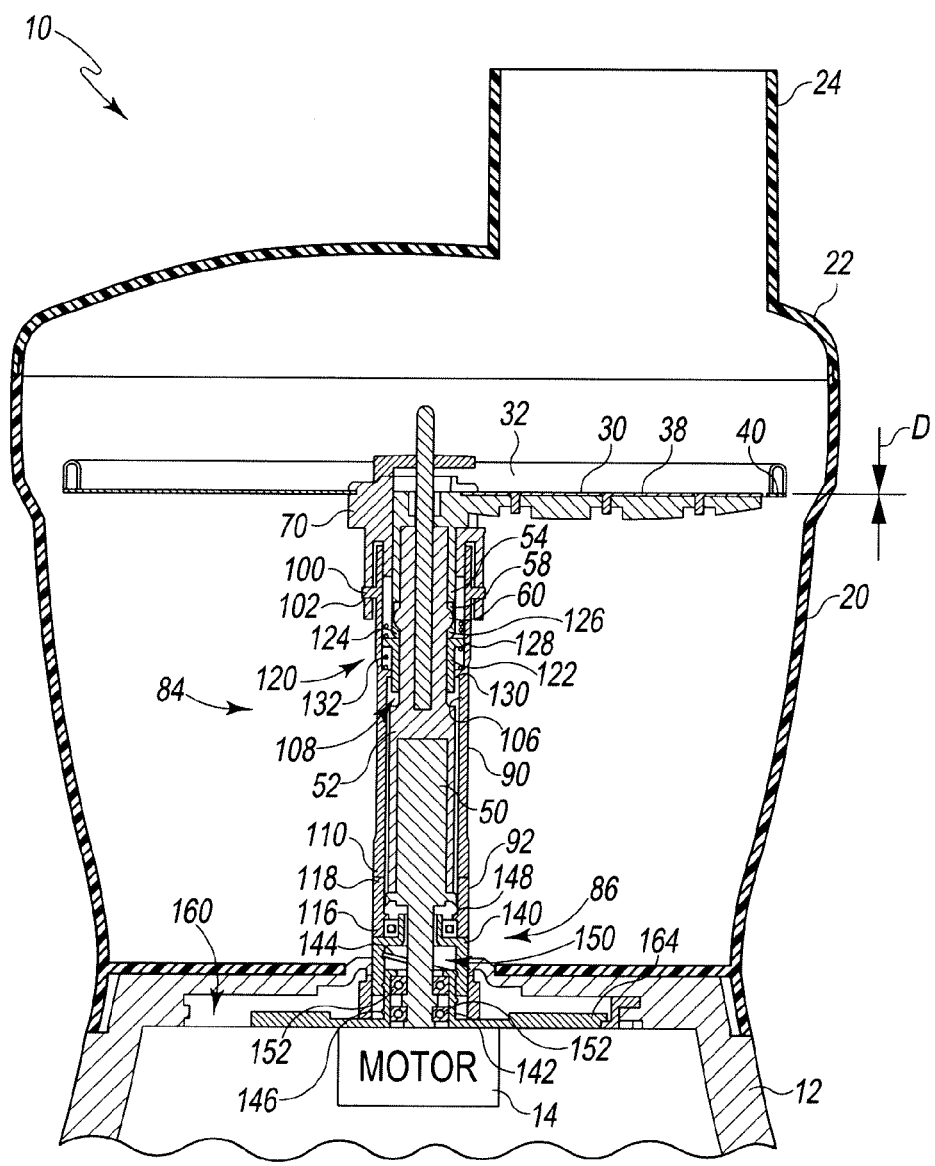
FIG. 3 is a partial cross-sectional side elevation view of the food processor of FIG. 1 showing a cutting assembly that includes a rotating disk and a cutting blade.
Figure 4:
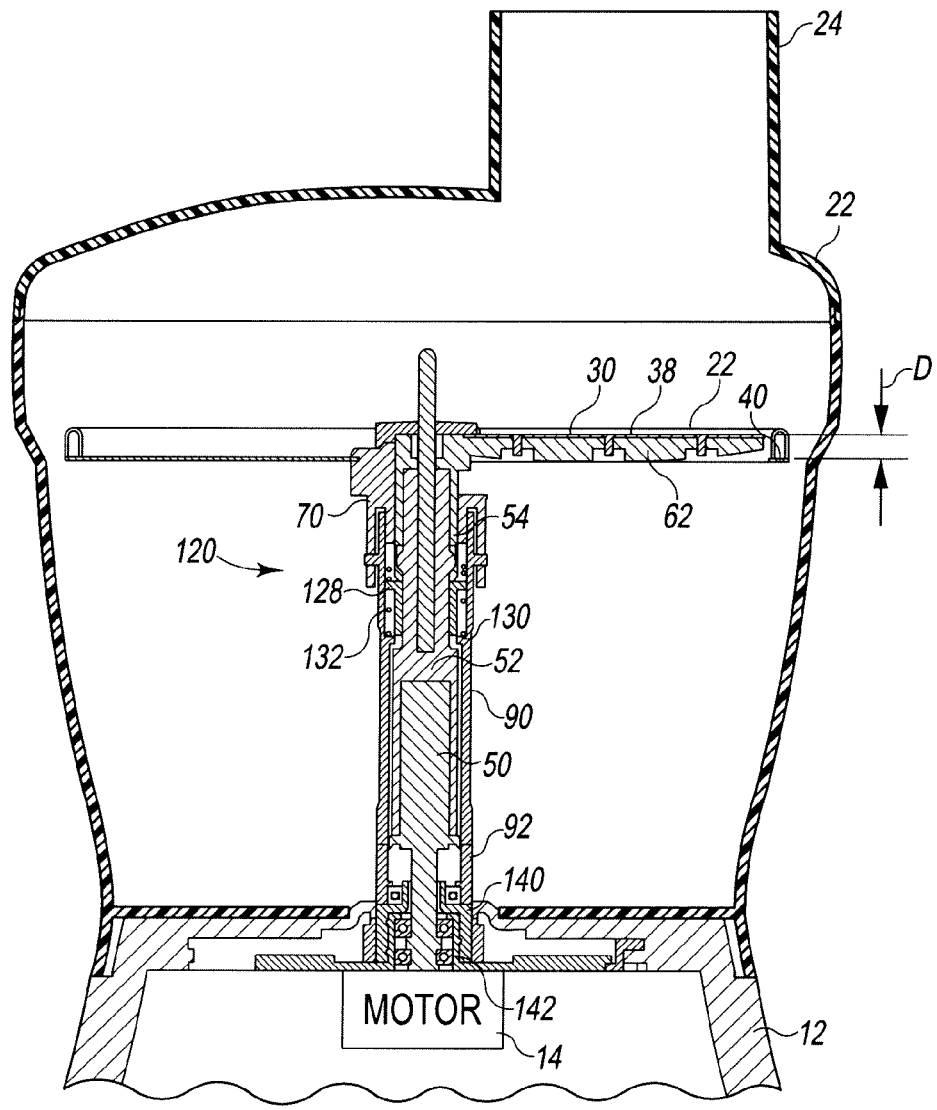
FIG. 4 is a view similar to FIG. 3 showing the rotating disk in another position relative to the cutting blade.

Referring now to FIGS. 2-4, the motor 14 includes an output shaft 50 extending upwardly from the base 12. The output shaft 50 is coupled to a drive stem 52, which is in turn coupled to a central shaft 54 of a blade assembly 56 of the cutting assembly 16. The central shaft 54 has a socket 58 formed in its lower end. A pair of tabs 60 extending from the upper end of the drive stem 52 is received in the socket 58, thereby coupling the drive stem 52 (and hence the output shaft 50 of the motor 14) to the central shaft 54 of the blade assembly 56. As such, rotation of the output shaft 50 causes rotation of the blade assembly 56. It should be appreciated that the position of the socket and the tabs may be reversed with the tabs being formed in the central shaft 54 and the socket being formed on the drive stem 52.

The blade assembly 56 also includes a mounting arm 62 that extends outwardly from the central shaft 54. The cutting blade 30 is secured to the upper surface of the mounting arm 62. In the exemplary embodiment, the central shaft 54 and the mounting arm 62 are formed from a metallic material as a single monolithic component. It should be appreciated that in other embodiments the shaft 54 and the arm 62 may be formed as separate components, which are then joined together during final assembly by an adhesive or other suitable fastener.

A number of fasteners 64 (i.e., screws) positioned at a rear edge 66 of the cutting blade 30 extend into the mounting arm 62, thereby rigidly securing the cutting blade 30 to the mounting arm 62. It will be appreciated that in other embodiments the fasteners 64 may take the form of T-stakes, pins, posts, or other structures capable of securing the cutting blade 30 to the arm 62. As best seen in FIG. 2, the arm 62 includes an overmold 68 that receives the cutting blade 30.

The rotating disk 32 includes a central hub 70, a planar body 72 extending radially outward the central hub 70, and a rim 74 extending upwardly from the outer perimeter of the planar body 72. The rotating disk 32 has a diameter that is slightly less than the inner diameter of the bowl 20 such that the rim 74 is positioned adjacent to, but is slightly spaced apart from, the inner wall of the bowl to permit rotation of the disk 32 within the bowl 20. In the exemplary embodiment described herein, the planar body 72 and the rim 74 are embodied as a monolithic structure (e.g., a single molded or cast part). However, it should be appreciated that all of the components of the rotating disk 32 (e.g., hub 70, body 72, and rim 74) may be integrated into a single monolithic structure or may be formed as separate components secured to one another by an adhesive or other suitable fastener.

The hub 70 of the rotating disk 32 has a sidewall 76 that defines a passageway 78 extending through the hub 70. The central shaft 54 of the blade assembly 56 is positioned in the passageway 78. The hub 70 also has a pocket 80 defined in the sidewall 76 that opens into the passageway 78. The mounting arm 62 of the blade assembly 56 is received in the pocket 80, thereby torsionally securing the blade assembly 56 to the rotating disk 32. As such, rotation of the blade assembly 56 by the output shaft 50 causes rotation of the rotating disk 32.

The mounting arm 62 extends outwardly from the pocket 80 and is positioned in an oblong opening 82 formed in the rotating disk 32. The rotating disk 32 is permitted to vertically slide relative to the mounting arm 62 and the blade 30. In use, when the cutting thickness is adjusted, the rotating disk 32 slides upwardly or downwardly relative to the blade assembly 56 (e.g., cutting blade 30). Because the blade assembly 56 is fixed to the drive stem 52, the cutting blade 30 is maintained in its vertical position such that, as the rotating disk 32 moves upwardly or downwardly, the distance D defined between the cutting edge 38 of the cutting blade 30 and the upper surface 40 of the rotating disk 32 changes, thereby changing the cutting thickness. As seen in FIG. 3, the distance D defined between the cutting edge 38 of the cutting blade 30 and the upper surface 40 of the rotating disk 32 is relatively small, resulting in thinner slices. Oppositely, as shown in FIG. 4, the distance D defined between the cutting edge 38 of the cutting blade 30 and the upper surface 40 of the rotating disk 32 is larger because the rotating disk 32 has moved downward relative to the cutting blade 30, which results in thicker slices.

As described above, the food processor 10 includes the thickness adjustment assembly 42, which is operable to move the rotating disk 32 relative to the cutting blade 30. The adjustment assembly 42 includes a two-piece adaptor 84 coupled to the hub 70 of the rotating disk 32, a lift device 86 supporting the adaptor 84 and the rotating disk 32, and a gear assembly 88 positioned in the base 12. The adaptor 84 includes an upper shaft 90 secured to the hub 70 of the rotating disk 32 and a lower shaft 92 rotatively coupled to the lift device 86. The upper shaft 90 has a cylindrical body 94 that extends from an upper end 96 to a lower end 98. The upper end 96 of the upper shaft 90 has a pair of tabs 100 extending outwardly therefrom. Each tab 100 is positioned in a corresponding slot 102 defined in the hub 70, thereby securing the shaft 90 to the rotating disk 32 such that rotation of the rotating disk 32 causes rotation of the shaft 90. At the lower end 98 of the shaft 90, a plurality of teeth 110 are formed in the body 94 to secure the upper shaft 90 to the lower shaft 92, as described in greater detail below.

The shaft 90 of the adaptor 84 also includes an opening 104 that is defined in the upper end 96 of the cylindrical body 94. The body 94 includes an inner wall 106 extending downwardly from the opening 104 and defining a passageway 108 through the body 94. When assembled, the shaft 90 is positioned over the drive stem 52 and the lower end of the central shaft 54 of the blade assembly 56 such that the stem 52 and shaft 54 are received in the passageway 108.

The lower shaft 92 of the adaptor 84 is torsionally secured to the lower end 98 of the shaft 90 such that the rotation of the shaft 90 causes rotation of the shaft 92. The lower shaft 92, like the upper shaft 90, has a cylindrical body 112 extending from an upper end 114 to a lower end 116. The body 112 includes a plurality of teeth 118, which are formed at the upper end 114. When the adaptor 84 is assembled, the teeth 118 of the lower shaft 92 are interdigitated with the teeth 110 of the upper shaft 90, thereby securing the shafts 90, 92 together. It will be appreciated that in other embodiments a combination of pins and slots as well as other fastening means may be used to torsionally secure the shafts 90 to the shaft 92.

As shown in FIGS. 3-4, the shaft 90 includes a biasing mechanism 120 positioned in the passageway 108, and the biasing mechanism 120 is configured to bias the upper shaft 90 into engagement with the lower shaft 92. The biasing mechanism 120 includes a sleeve 122 positioned in the middle of the passageway 108. The sleeve 122 has the drive stem 52 of the motor 14 extending therethough.

The sleeve 122 includes an upper rim 124 that contacts the lower surface 126 of the central shaft 54 of the blade assembly 56 when the upper shaft 90 is secured to the rotating disk 32. A flange 128 extends outwardly from the upper rim 124. Similarly, the inner wall 106 of the upper shaft 90 includes an inner flange 130 extending inwardly into the passageway 108. A biasing element, such as a spring 132, is positioned between the flanges 128, 130. The spring 132 urges the shaft 90 downward to maintain engagement between the teeth 110, 118 such that the shafts 90, 92 remain coupled together.

The lift device 86 is operable to move the adaptor 84 (and hence rotating disk 32) upwardly and downwardly relative to the base. The lift device 86 includes a screw-type drive assembly having an internally-threaded upper sleeve 140 and an externally-threaded lower sleeve 142. The internal threads 144 of the upper sleeve 140 threadingly engage the external threads 146 of the lower sleeve 142 to move the upper sleeve 140 upwardly and downwardly relative to the base 12. For example, counter-clockwise rotation of the upper sleeve 140 may cause downward movement of the upper sleeve 140, while clockwise rotation of the upper sleeve 140 may cause upward movement of the upper sleeve 140.

The lower end 116 of the shaft 92 of the adaptor 84 is rotatively coupled to the upper sleeve 140 of the lift device 86 via a bearing 148. In that way, the shaft 92 (and hence cutting assembly 16) is permitted to rotate relative to the upper sleeve 140. At the same time, the bearing 148 fixes the axial position of the shaft 92 relative to the upper sleeve 140 such that upward and downward movement of the upper sleeve 140 causes upward and downward movement of the shaft 92.

In use, the thickness of food items being processed by the food processor 10 changes as the upper sleeve 140 translates upwardly and downwardly because the adaptor 84 moves with the upper sleeve 140. In particular, as the upper sleeve 140 moves downwardly along the lower sleeve 142, the lower shaft 92 of the adaptor 84 moves downwardly with the upper sleeve 140. The spring 132 within the upper shaft 90 urges the upper shaft 90 to move downwardly with the lower shaft 92. Because the upper shaft 90 is secured to the hub 70 of the rotating disk 32, that vertical movement of the upper shaft 90 of the adaptor 84 causes vertical movement of the rotating disk 32 relative to the cutting blade 30. As such, when the upper sleeve 140 is moved downwardly, the rotating disk 32 is moved downwardly, and the distance D between the cutting edge 38 of the cutting blade 30 and the upper surface 40 of the rotating disk 32 is increased, thereby producing thicker pieces of food items. Oppositely, as the upper sleeve 140 translates upwardly along the lower sleeve 142, the rotating disk 32 moves upwardly, and the distance D between the cutting edge 38 of the cutting blade 30 and the upper surface 40 of the rotating disk 32 decreases, thereby producing thinner pieces of food items.

While the lift device 86 is operable to change the vertical position of the rotating disk 32, the lift device 86 is isolated from the rotational force of the motor 14 such that the lift device 86 is not driven along with the cutting assembly 16. As described above, the adaptor 84, which rotates with the cutting assembly 16, is rotatively coupled to the upper sleeve 140 via the bearing 148. Additionally, in the illustrative embodiment, the upper sleeve 140 has a hollow passageway 150 extending therethrough. The output shaft 50 of the motor 14 is positioned in the hollow passageway 150, and the hollow passageway 150 is sized such that the output shaft 50 is spaced apart from the upper sleeve 140. The output shaft 50 is rotatively coupled to the lower sleeve 142 via a pair of bearings 152 such that the output shaft 50 is permitted to rotate relative to the lower sleeve 142. As such, rotational force from the output shaft 50 is not transmitted to the sleeves 140, 142 of the lift device 86.

The lower sleeve 142 is secured to the base 12 such that the sleeve 142 does not rotate. The base 12 has a compartment 160 that is defined by an outer wall 162. A platform 164 is positioned within the compartment 160, and the lower sleeve 142 is secured to the platform 164. As best seen in FIG. 2, the gear assembly 88 is also positioned within the compartment 160. The gear assembly 88 includes a drive gear 170 and a guide gear 172 that are pivotally coupled to the platform 164. Each of the gears 170, 172 is an external gear having a plurality of teeth 174, 176 defined on an outer surface 178, 180 thereof. The teeth 174, 176 are interdigitated such that rotation of the drive gear 170 causes rotation of the guide gear 172.

Figure 5:
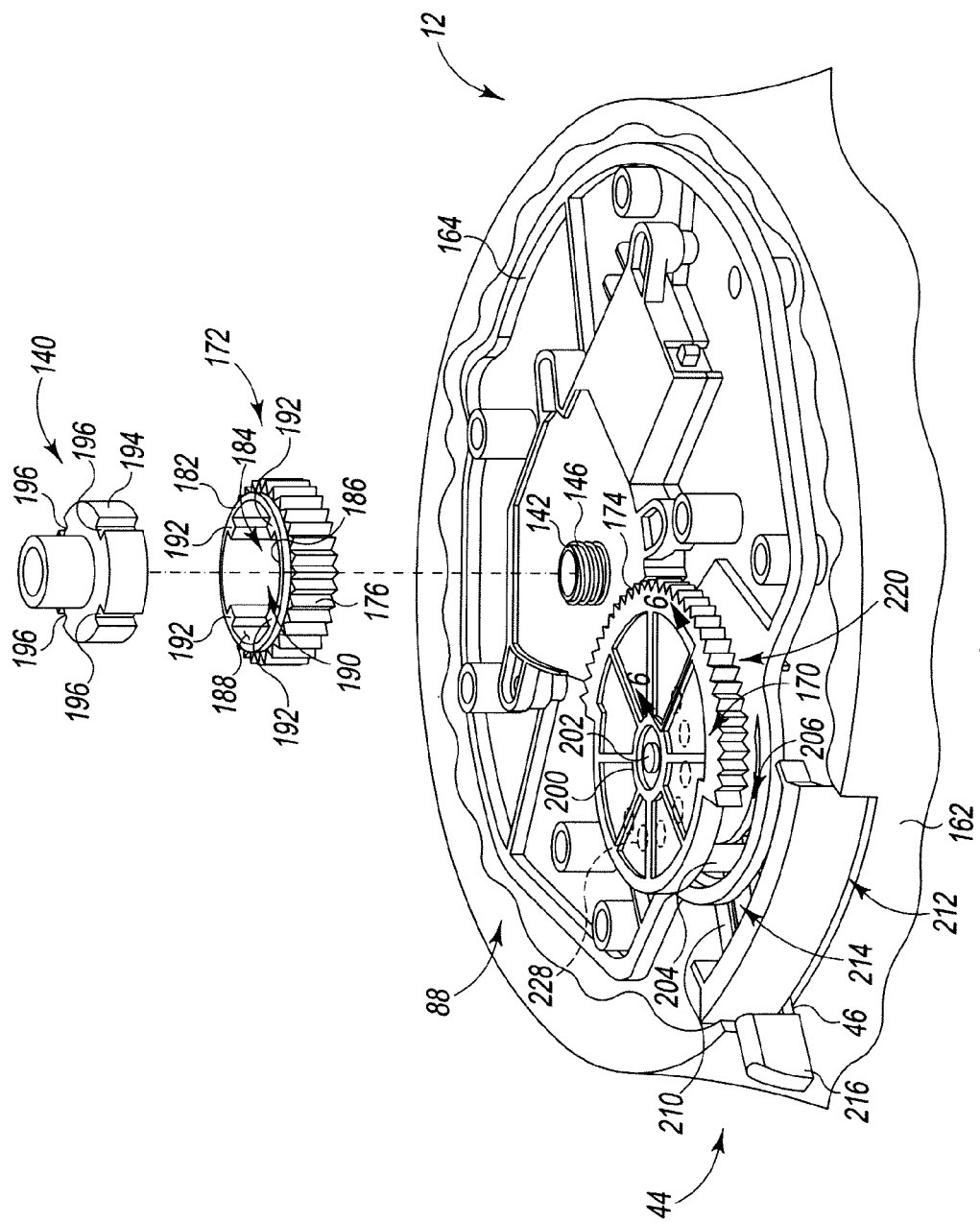
FIG. 5 is an exploded, partial cross-sectional perspective view of the base of the food processor of FIG. 1.

As best seen in FIG. 5, the guide gear 172 has a body 182 configured to be rotatively coupled to the platform 164. The body 182 includes an opening 184 defined in an upper surface 186 and an inner wall 188 extending downwardly from the opening 184. The inner wall 188 defines a passageway 190 extending through the body 182 of the gear 172. A plurality of splines 192 extend inwardly from the inner wall 188 into the passageway 190.

The upper sleeve 140 of the lift device 86 is moveably coupled to the guide gear 172. The upper sleeve 140 includes an outer surface 194 having a plurality of grooves 196 defined therein. Each groove 196 is sized to receive one of the splines 192 of the gear 172, thereby coupling the sleeve 140 to the guide gear 172 and permitting the sleeve 140 to translate upwardly and downwardly relative to the gear 172. As such, rotation of the guide gear 172 causes rotation of the upper sleeve 140 relative to the lower sleeve 142. As described above, rotation of the upper sleeve 140 causes movement of the upper sleeve 140 upwardly or downwardly and changes the thickness of food items being processed by the food processor 10.

As best seen in FIG. 5, the drive gear 170 includes a body 200 that is positioned in the compartment 160 of the base 12. The body 200 is pivotally coupled to a platform 164 of the base 12 via a pivot pin 202. The drive gear 170 includes a shaft 204 that extends downwardly from the body 200. The shaft 204 is extends through a curved slot 206 defined in the platform 164.

The external control device 44 is configured to operate the lift device 86 and the gear assembly 88 to move the rotating disk 32 upwardly and downwardly and thereby change the thickness of food items processed by the food processor 10. The control lever 46 of the external control device 44 is coupled to the drive gear 170. The lever 46 includes an arm 210 having a guide slot 214 defined therein. The shaft 204 of the gear 170 is positioned in the guide slot 214, thereby coupling the lever 46 to the gear 170.

The arm 210 extends outwardly through a horizontal track 212 defined in the outer wall 162 of the base 12. A grip 216 of the user-operated device 44 is secured at the end of the arm 210 positioned outside the base 12. When the food processor is assembled, the grip 216 is positioned below the removable bowl 20. The arm 210, like the drive gear 170, is pivotally coupled to the platform 164 such that the grip 216 is moveable between a plurality of adjustment positions relative to the base 12.

In use, movement of the grip 216 of the control lever 46 relative to the base 12 causes the arm 210 to pivot and advance the shaft 204 of the gear 170 along the slot 206. As the shaft 204 advances along the slot 206, the drive gear 170 and guide gear 172 rotate. As described above, rotation of the guide gear 172 causes movement of the upper sleeve 140 upwardly or downwardly and changes the thickness of food items being processed by the food processor 10. Each adjustment position of the grip 216 corresponds to one of the preset cutting positions of the cutting assembly 16.

Figure 6:
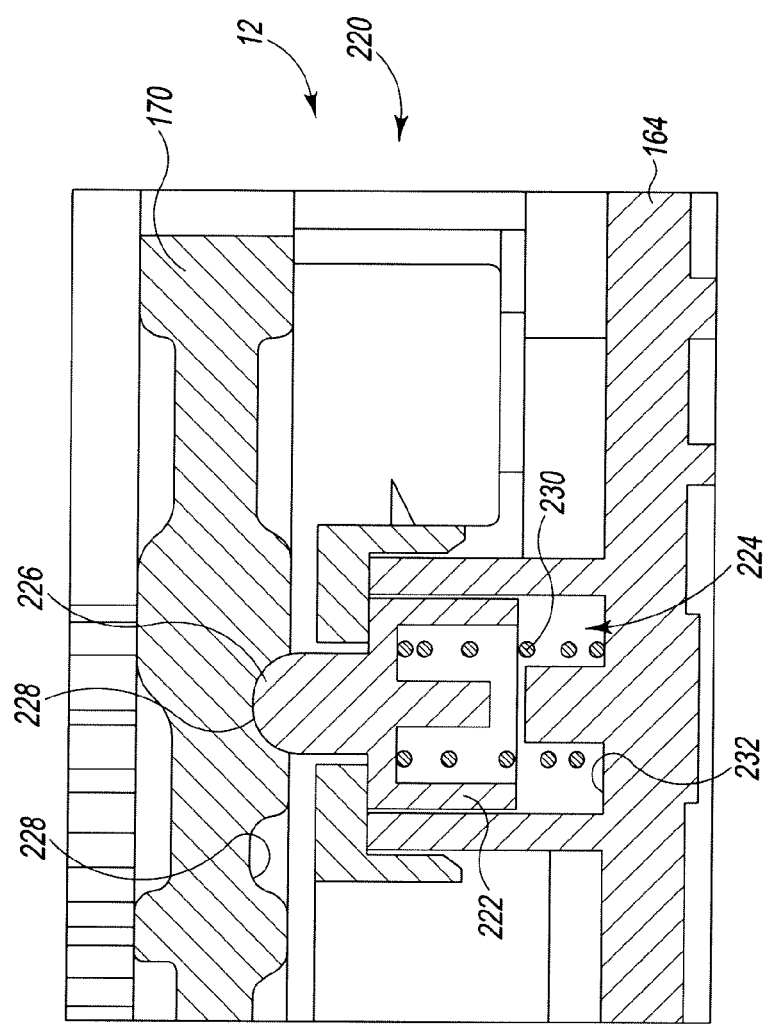
FIG. 6 is a partial cross-sectional view of the base of the food processor of FIG. 1 taken along the line 6-6 of FIG. 5.

Referring now to FIGS. 5 and 6, the food processor 10 includes a locking mechanism 220 configured to inhibit movement of the control lever 46 relative to the base 12 and thereby maintain the cutting assembly 16 at its current cutting position. The locking mechanism 220 includes a pin 222 positioned in an aperture 224 defined in the platform 164. The convex upper end 226 of the pin 222 is configured to be received in a plurality of concave notches 228 defined in the bottom surface of the body 200 of the drive gear 170. Each notch 228 corresponds to an adjustment position of the control lever 46 and hence a cutting position of the cutting assembly 16.

As shown in FIG. 6, a biasing element, such as spring 230, is positioned between the pin 222 and the bottom surface 232 of the aperture 224. The spring 230 urges the pin 222 into engagement with the notch 228 corresponding to the present adjustment position of the control lever 46. However, when the user desires to change the thickness of the food items being processed by the food processor 10, the user may grab the grip 216 and advance the control lever 46 along the track 212. Doing so moves the convex pin 222 along the concave surface of the notch 228 and overcomes the bias of the spring 230, thereby moving the pin 222 downward and permitting the pin 222 to slide along the bottom surface of the gear 170 to the next notch 228 corresponding to the next adjustment position.

In use, a user operates the controls 18 to energize the motor 14 to rotate the output shaft 50 and the drive stem 52. Because the cutting assembly 16 is secured the drive stem 52 via the central shaft 54, rotation of the output shaft 50 causes rotation of the cutting assembly 16. While the motor 14 is energized, the user may advance food items into the processing chamber 26 through the feed tube 24 to be cut by the rotating cutting assembly 16.

If the user desires to change the cutting thickness during the cutting operation, the user may grab the grip 216 and advance the control lever 46 along the track 212 to another adjustment position. Movement of the control lever 46 causes the control lever 46 to pivot and rotate the drive gear 170 and guide gear 172. As described above, rotation of the guide gear 172 causes rotation of the upper sleeve 140 relative to the lower sleeve 142 and moves the upper sleeve 140 upwardly or downwardly relative to the base 12. Because the adaptor 84 is secured to both the upper sleeve 140 and the rotating disk 32, movement of the upper sleeve 140 causes movement of the disk 32 relative to the cutting blade 30, thereby changing the distance D between the cutting edge 38 of the cutting blade 30 and the upper surface 40 of the rotating disk 32 and, consequently, the thickness of food items being processed by the food processor 10.

Figure 7:
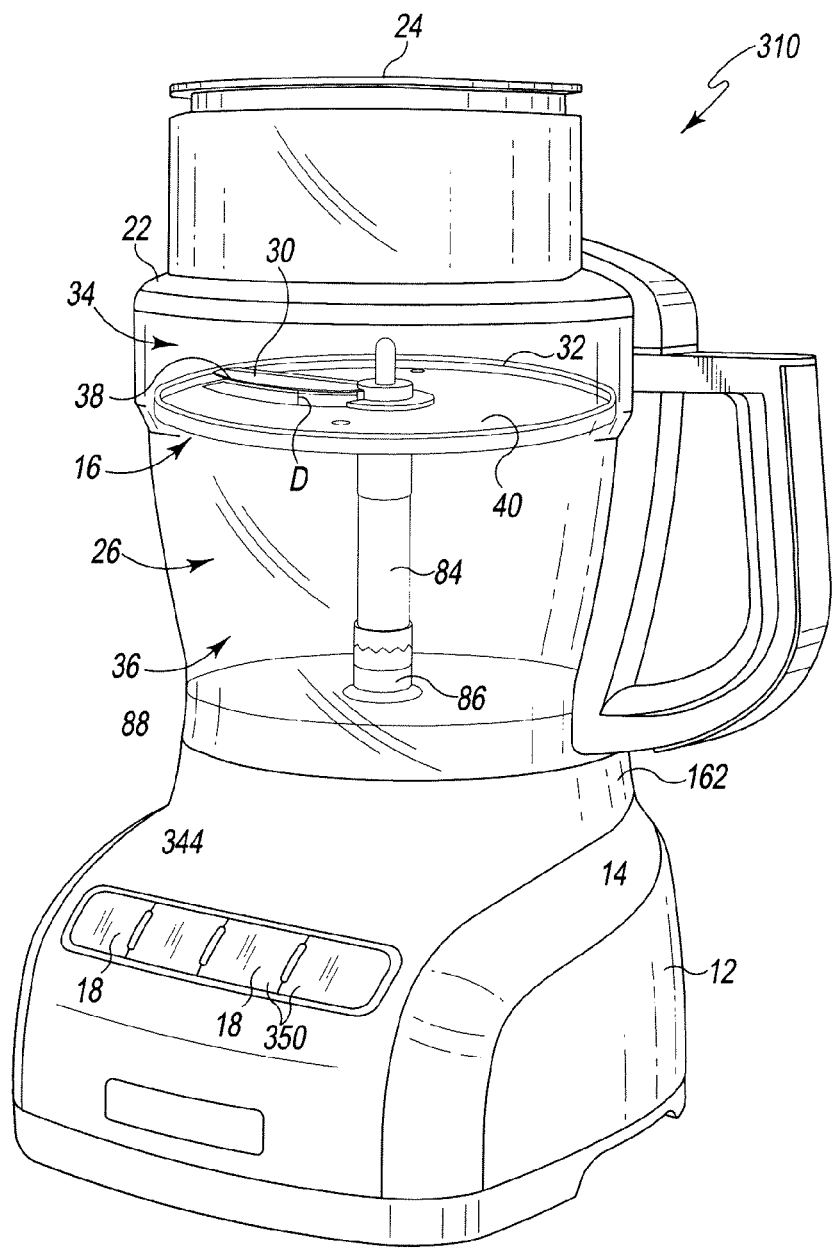
FIG. 7 is a perspective view of another embodiment of a food processor.

Referring now to FIG. 7, another embodiment of a food processor (hereinafter referenced as a food processor 310) is shown. Some features of the embodiment illustrated in FIG. 7 are substantially similar to those discussed above in reference to the embodiment of FIGS. 1-6. Such features are designated in FIG. 7 with the same reference numbers as those used in FIGS. 1-6.

The food processor 310 has a base 12 that houses a motor 14 and a control unit. Under the control of the control unit, the motor 14 drives a cutting assembly 16 to cut food items such as cheeses, meats, fruits, and vegetables. The base 12 also includes one or more buttons, switches, dials, or other types of controls 18. A user operates the controls 18 to control the operation of the motor 14 and hence the food processor 310. For example, one of the controls 18 may be operable to turn the motor 14 on and off while another control 18 may change the motor's speed.

As will be understood by those skilled in the art, the control unit may comprise analog and/or digital circuitry to process electrical signals received from the motor 14 (or other components of the food processor 310) and provide electrical control signals to the motor or other components of the food processor 310. For example, the control unit may be embodied as a microcontroller that executes firmware routines to control the operation of the food processor 310.

The food processor 310 also includes a removable receptacle or bowl 20 secured to the base 12, and the bowl 20 has a removable lid 22 secured to its upper peripheral edge. Collectively, the lid 22 and the bowl 20 define a processing chamber 26 where food items are processed by the cutting assembly 16.

As shown in FIG. 7, the cutting assembly 16 includes a cutting blade 30 and a rotating disk 32. A vertical distance, D, between the cutting edge 38 of the cutting blade 30 and the upper surface 40 of the rotating disk 32 defines a cutting thickness of food items processed by the cutting assembly 16. In other words, the thickness of the pieces of food items cut by the food processor 10 is determined by the distance D between the cutting edge 38 of the cutting blade 30 and the upper surface 40 of the rotating disk 32.

The food processor 310 also includes a thickness adjustment assembly 342, which is operable by a user to vary the cutting thickness of the food processor 10 while the cutting assembly 16 is driven by the motor 14, thereby creating thicker or thinner pieces of cut food items during a cutting operation. Like the thickness adjustment assembly 42 of the embodiment of FIGS. 1-6, the thickness adjustment assembly 342 includes a two-piece adaptor 84 coupled to the rotating disk 32, a lift device 86 supporting the adaptor 84 and the rotating disk 32, and a gear assembly 88 positioned in the base 12. The thickness adjustment assembly 342 also includes a motor 344 (shown in diagrammatic form) that is coupled to the gear assembly 88 and operable to rotate the drive gear 170 and guide gear 172 of the gear assembly 88 and thereby raise and lower the rotating disk 32 relative to the cutting blade 30. A user operates a pair of buttons 350 of the controls 18 to control the operation of the motor 344 and hence the thickness adjustment assembly 42. In that way, the motor 344 and buttons 350 replace the control lever 46 as the mechanism by which the gear assembly 88 and lift device 86 are operated to change the thickness of the processed food items.

In other embodiments, the adjustment assembly may include other electromechanical components such that the user may adjust the cutting thickness at the touch of a button while the cutting assembly 16 is driven by the motor 14. The electromechanical components may include, for example, a small motor that would directly operate a screw-type drive assembly without a gear assembly while the other motor drives the cutting assembly. The electromechanical components may also include control circuitry to process electrical signals received from the second motor and provide electrical control signals to the second motor. For example, the control circuitry may be embodied as a microcontroller that executes firmware routines to control the operation the second motor to adjust the cutting thickness of the cutting assembly. Additional controls or buttons to control the operation of the second motor may be added to the food processor.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food choppers, slicers, dicers, ice shavers and the like. Additionally, while the cutting assembly 16 was illustratively embodied as an adjustable slicing disk attachment, the concept of an adjustable cutting assembly 16 can also be implemented with other cutting attachments, such as, for example, a shedding disk, grate/shaving disk, julienne disk, and the like.

It will also be appreciated that in other embodiments the threaded sleeves 140, 142 of the lift device 86 may be replaced with a series of ramp structures or cams that slide relative to one another to change the position of the rotating disk 32 relative to the cutting blade 30. Additionally, it will also be appreciated that in other embodiments the rotating disk may be vertically fixed and the cutting blade may be configured to move relative to the rotating disk to change the cutting thickness.

Other embodiments of a food processor are shown in greater detail in FIGS. 8-20. Some features of the embodiments illustrated in FIGS. 8-20 are substantially similar to those discussed above in reference to the embodiments of FIGS. 1-7. Such features are designated in FIGS. 8-20 with the same reference numbers as those used in FIGS. 1-7.

Figure 8:
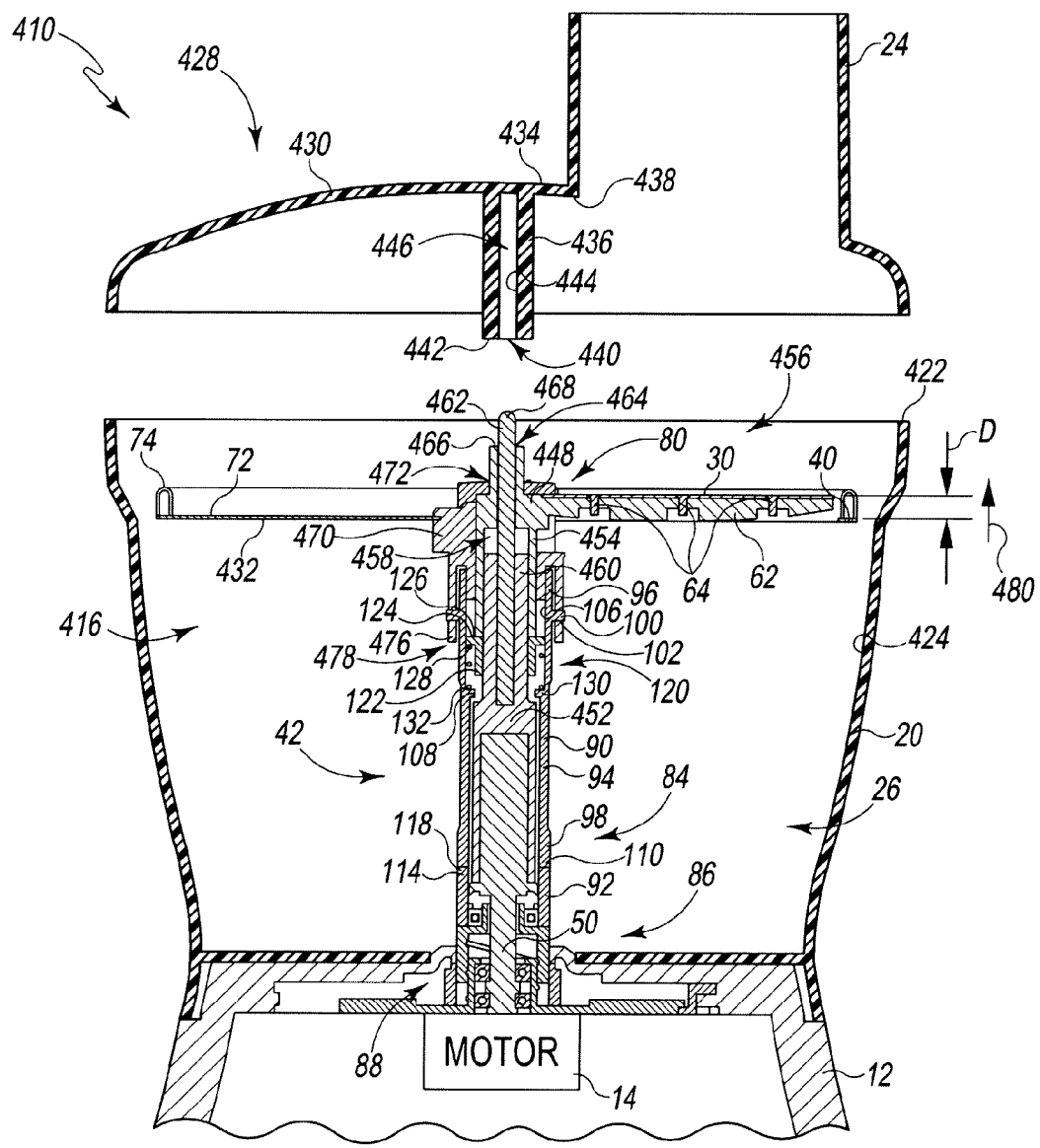
FIG. 8 is a partial cross-sectional side elevation view of the food processor of FIG. 1 including another embodiment of a cutting assembly and removable lid.
Figure 9:
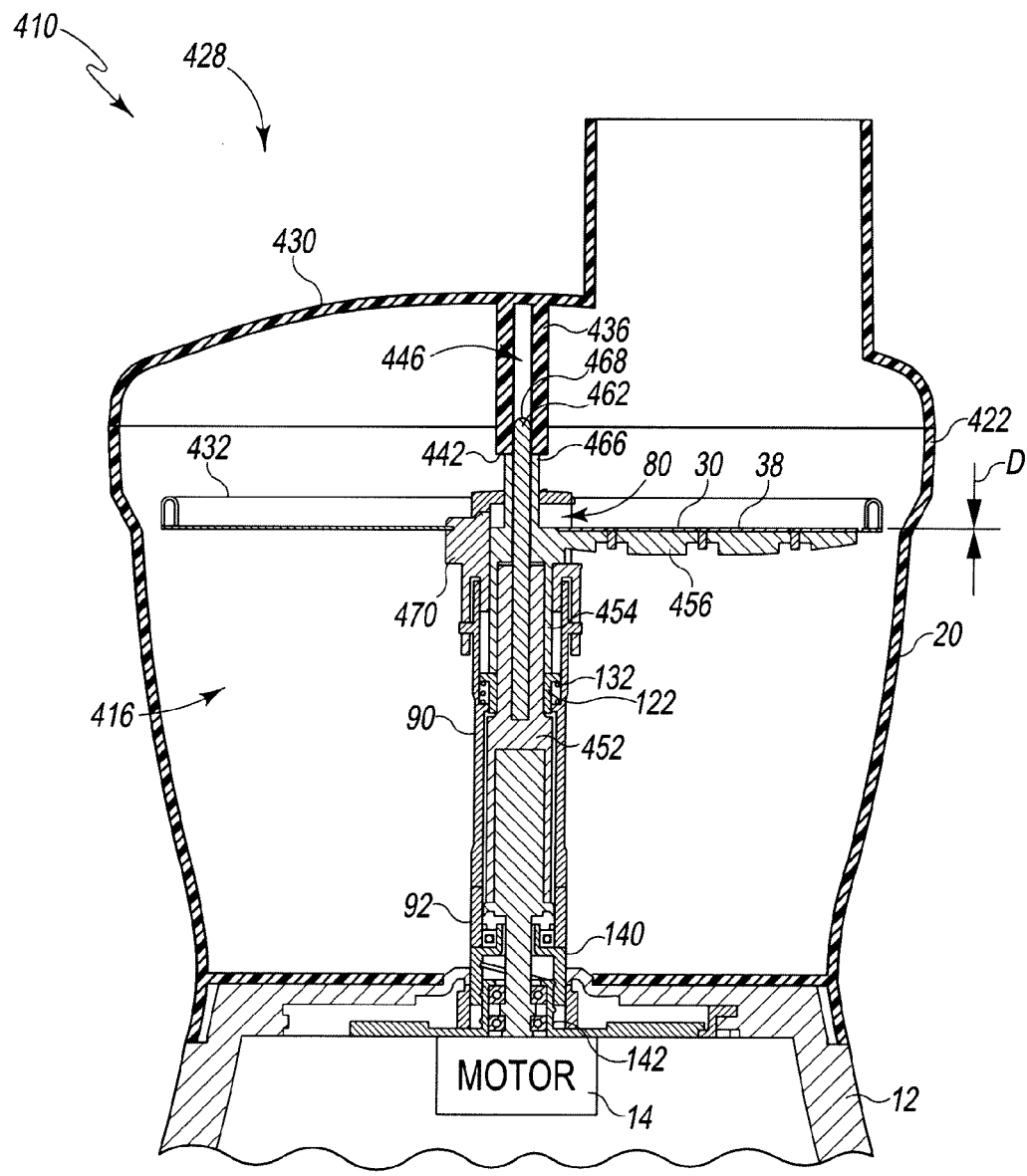
FIG. 9 is a partial cross-sectional side elevation view of the food processor similar to FIG. 8.

Referring now to FIGS. 8 and 9, another embodiment of a food processor (hereinafter food processor 410) is shown. The food processor 410 includes another embodiment of a cutting assembly (hereinafter cutting assembly 416) and another embodiment of a removable lid (hereinafter lid 428), which engages the cutting assembly to seat the cutting assembly on the drive stem, as described in greater detail below.

As shown in FIG. 8, the food processor 410 has a base 12 that houses a motor 14 and a control unit (not shown). Under the control of the control unit, the motor 14 drives the cutting assembly 416 to cut food items such as cheeses, meats, fruits, and vegetables. The food processor 410 also includes a removable receptacle or bowl 20 that is secured to the base 12. The bowl 20 has an upper rim 422 and an inner wall 424 that extends downwardly from the upper rim 422 to define part of a processing chamber 26 where food items may be processed by the cutting assembly 416.

The removable lid 428 is configured to be secured to the rim 422 of the bowl 20. In that way, the removable lid 428 and the bowl 20 cooperate to define the processing chamber 26. The lid 428 also has a feed tube 24 formed thereon through which food items such as fruits and vegetables may be inserted into the bowl 20 to be processed by the food processor 10. The lid 428 of the food processor 410 includes a shell 430, and the feed tube 24 extends upwardly from the outer surface 434 of the shell 430. The shell 430 has a sleeve 436 that extends downwardly from an inner surface 438 thereof. The sleeve 436 has an opening 440 defined in a lower end 442, and an inner wall 444 that extends from the opening 440 to define an aperture 446 in the sleeve 436.

As described above, the cutting assembly 416 of the food processor 410 is driven by the motor 14 to cut food items. The motor 14 includes an output shaft 50 extending upwardly from the base 12. The output shaft 50 is coupled to a drive stem 452, which is in turn configured to be secured to the cutting assembly 416. The cutting assembly 416 includes a rotating disk 432 and a blade assembly 456, and the blade assembly 456 includes a cutting blade 30 that is secured to a blade carrier 448. The blade carrier 448 has a central shaft 454 and a mounting arm 62 that extends outwardly from the central shaft 454. The cutting blade 30 is secured to the upper surface of the mounting arm 62 via a number of fasteners 64. Like the embodiments of FIG. 1-7, the rotating disk 432 is configured to slide vertically relative to the cutting blade 30 to adjust the cutting thickness of the cutting assembly 416, as described in greater detail below.

The central shaft 454 of the blade carrier 448 has a socket 458 formed in its lower end, and the drive stem 452 has an upper end 460 that is keyed to match the configuration of the socket 458. In the illustrative embodiment, the upper end 460 includes two flat surfaces (not shown) connected at each end by a curved surface (not shown), and the socket 458 has a corresponding geometric shape that is sized to receive the upper end 460 of the drive stem 452. When the cutting assembly 416 is seated on the drive stem 452, as shown in FIG. 9, the keyed upper end 460 of the stem 452 is received in the socket 458 of the central shaft 454. As such, rotation of the output shaft 50 of the motor 14 causes rotation of the cutting assembly 416.

It should be appreciated that in other embodiments the arrangement of the socket and keyed end may be reversed, with the keyed end being formed on the central shaft 454 and the socket being defined in the drive stem 452. It should also be appreciated that in other embodiments other methods of attachment may be used to secure the drive stem to the cutting assembly.

As shown in FIGS. 8 and 9, the drive stem 452 of the food processor 410 includes a center rod 462 that extends outwardly through an opening 464 defined in the upper end 466 of the blade carrier 448. The aperture 446 of the sleeve 434 of the lid 428 is sized to receive the center rod 462 such that the tip 468 of the center rod 462 may be positioned in the aperture 446 when the lid 428 is secured to the bowl 20, as shown in FIG. 9. Additionally, when the lid 428 is secured to the bowl 20, the lower end 442 of the sleeve 434 of the lid 428 engages the upper end 460 of the blade carrier 448 to seat the blade assembly 456 on the drive stem 452, as described in greater detail below.

The rotating disk 432 of the cutting assembly 416 includes a central hub 470, a planar body 72 extending radially outward the central hub 470, and a rim 74 extending upwardly from the outer perimeter of the planar body 72. The hub 470 of the rotating disk 432 has a sidewall 476 that defines a passageway 478 extending through the hub 470. As shown in FIG. 8, the central shaft 454 of the blade assembly 456 is positioned in the passageway 478, and the center rod 462 of the drive stem 452 extends outwardly through an upper opening 472 of the passageway 478. The hub 470 also has a pocket 80 defined in the sidewall 476 that opens into the passageway 478. The mounting arm 62 of the blade assembly 56 is received in the pocket 80, thereby torsionally securing the blade assembly 456 to the rotating disk 32. In the illustrative embodiment, the central shaft 454, the mounting arm 62, and the hub 470 are keyed such that the blade assembly 456 is torsionally secured to the rotating disk 432. As such, rotation of the output shaft 50 causes rotation of the rotating disk 432 and the cutting blade 30.

The food processor 410 also includes a thickness adjustment assembly 42, which is operable to move the rotating disk 432 relative to the cutting blade 30. The adjustment assembly 42 includes a two-piece adaptor 84, a lift device 86 supporting the adaptor 84 and the rotating disk 432, and a gear assembly 88 positioned in the base 12. The lift device 86 is operable to move the adaptor 84 (and hence rotating disk 432) upwardly and downwardly relative to the base 12 of the food processor 410, and the gear assembly 88 is configured to operate the lift device 86. As in the embodiment described above in regard to FIGS. 1-6, the food processor 410 includes an external control device (not shown) that is configured to operate the lift device 86 and the gear assembly 88 to move the rotating disk 432 upwardly and downwardly, thereby changing the thickness of food items processed by the food processor 410.

As shown in FIGS. 8 and 9, the adaptor 84 of the adjustment assembly 42 includes an upper shaft 90 configured to be secured to the hub 470 of the rotating disk 432. The upper shaft 90 has a cylindrical body 94 that extends from an upper end 96 to a lower end 98. The upper end 96 of the upper shaft 90 has a pair of tabs 100 extending outwardly therefrom. When the upper shaft 90 is secured to the hub 470, each tab 100 is positioned in a corresponding slot 102 defined in the hub 470, as shown in FIGS. 8 and 9. In that way, the shaft 90 is secured to the rotating disk 32 such that rotation of the rotating disk 32 causes rotation of the shaft 90. At the lower end 98 of the shaft 90, a plurality of teeth 110 are formed in the body 94 and are configured to engage a plurality of teeth 118 formed on the lower shaft 92 to thereby torsionally secure the upper shaft 90 to the lower shaft 92.

The upper shaft 90 of the adaptor 84 also includes an inner wall 106 that defines a passageway 108 through the body 94. When assembled with the base 12 and the cutting assembly 416, the upper shaft 90 is positioned over the drive stem 452 and the lower end of the central shaft 454 of the blade assembly 456 such that the stem 452 and the shaft 454 are received in the passageway 108 of the upper shaft 90.

As shown in FIGS. 8 and 9, the upper shaft 90 includes a biasing mechanism 120 positioned in the passageway 108, and the biasing mechanism 120 is configured to bias the upper shaft 90 into engagement with the lower shaft 92. The biasing mechanism 120 includes a sleeve 122 positioned in the middle of the passageway 108. When attached to the base 12, the sleeve 122 has the drive stem 452 of the motor 14 extending therethough.

The sleeve 122 of the biasing mechanism 120 includes an upper rim 124 that contacts the lower surface 126 of the central shaft 454 of the blade assembly 56 when the upper shaft 90 is secured to the rotating disk 32. A flange 128 extends outwardly from the upper rim 124 of the sleeve 122. Similarly, the inner wall 106 of the upper shaft 90 includes an inner flange 130 extending inwardly into the passageway 108. A biasing element, such as a spring 132, is positioned between the flanges 128, 130.

To assemble the food processor 410 for use, the user may operate the thickness adjustment assembly 42 to position the lift device 86 in a position corresponding to the minimal cutting thickness, as shown in FIG. 8. The user may align the upper shaft 90 of the adaptor 84 in the bowl 20 and advance the upper shaft 90 downward so that the drive stem 452 enters the passageway 108 of the upper shaft 90. The user may continue to advance the upper shaft 90 downward until the teeth 110 on the lower end 98 of the upper shaft 90 engage the teeth 118 on the upper end 114 of the lower shaft 92 of the adaptor 84.

The user may secure the upper shaft 90 of the adaptor 84 to the hub 470 of the rotating disk 432. To do so, the user may align the cutting assembly 416 with the drive stem 452 and advance the cutting assembly 416 downward so that the drive stem 452 enters the socket 458 defined in the central shaft 454 of the blade carrier 448. The user may continue to advance the cutting assembly 416 downward until the tabs 100 of the adaptor 84 are received in the slots 102 defined in the hub 470, as shown in FIG. 8. In that position, the lower surface 126 of the central shaft 454 contacts the upper rim 124 of the sleeve 122 of the biasing mechanism 120. Because the cutting blade 30 is not fixed axially, the cutting blade 30 is permitted to move in the direction indicated by the arrow 480. As shown in FIG. 8, the spring 132 urges the cutting blade 30 into a position in which the distance D defined between the cutting edge 38 of the cutting blade 30 and the upper surface 40 of the rotating disk 32 is increased.

The user may attach the lid 428 to the upper rim 422 of the bowl 20. To do so, the user aligns the sleeve 434 of the lid 428 with the tip 468 of the center rod 462 of the drive stem 452. The user then advances the lid 428 downward such that the lower end 442 of the sleeve 434 engages the upper end 460 of the blade carrier 448. As the user continues to advance the lid 428 downward, the bias exerted by the spring 132 is overcome, and the cutting blade 30 is moved downward such that the distance D defined between the cutting edge 38 of the cutting blade 30 and the upper surface 40 of the rotating disk 32 is decreased. As shown in FIG. 9, when the shell 430 of the lid 428 contacts the upper rim 422 of the bowl 20, the distance D defined between the cutting edge 38 of the cutting blade 30 and the upper surface 40 of the rotating disk 32 is relatively minimal, corresponding to the minimal cutting thickness of the cutting assembly 416.

It should be appreciated that the user may also attach the upper shaft 90 of the adaptor 84 to the cutting assembly 416 prior to attaching the assembly to the lower shaft 92 of the adaptor 84. Additionally, it should also be appreciated that the food processor 410 may be assembled with the lift device 86 in a position corresponding to any cutting thickness, including, for example, the maximum cutting thickness, rather than the minimal cutting thickness as shown in the illustrative embodiment.

Figure 10:
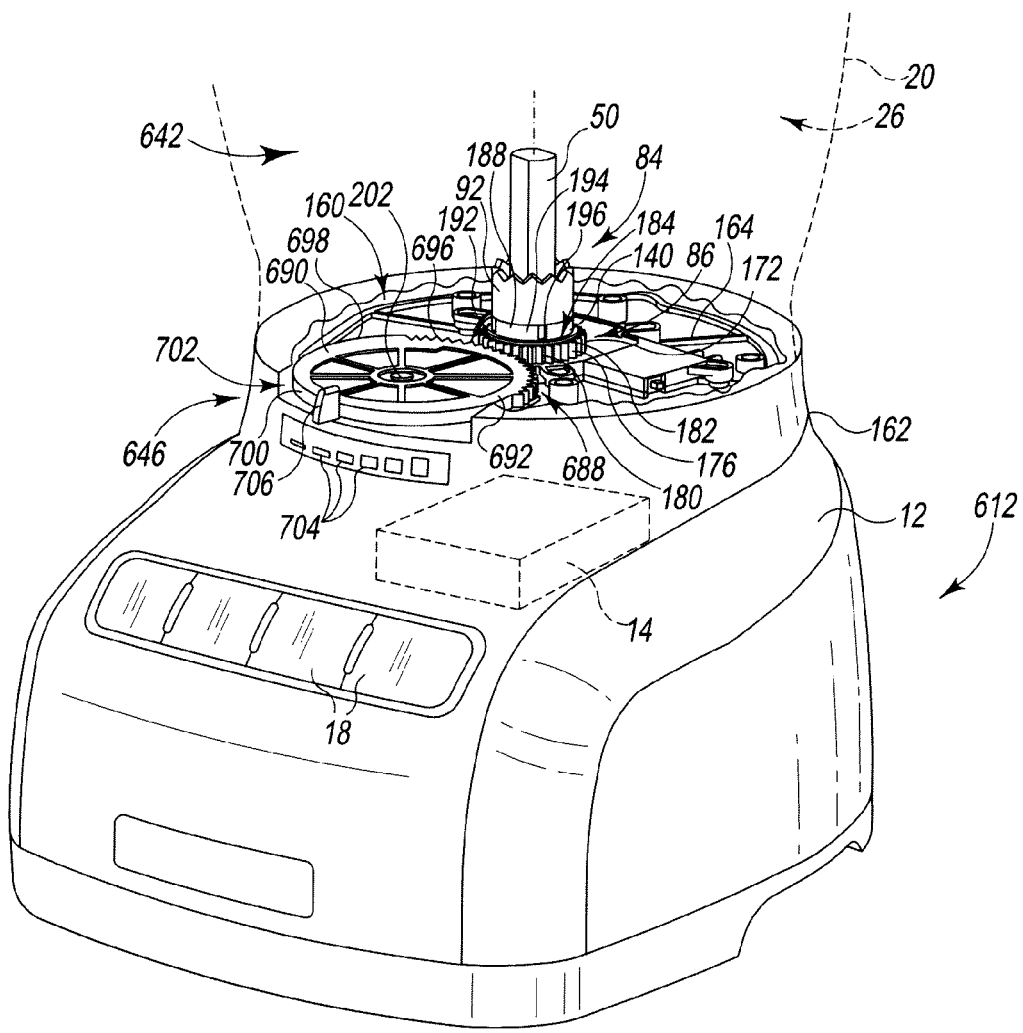
FIG. 10 is a partial cross-sectional perspective view of another embodiment of a base for a food processor.

Referring now to FIG. 10, another embodiment of a base (hereinafter base 612) is shown. The base 612 may be used with, for example, the other components of the food processor 10 described above in regard to FIGS. 1-6 or the components of the food processor 410 described above in regard to FIGS. 8 and 9. The base 612 includes another embodiment of a thickness adjustment assembly (hereinafter adjustment assembly 642). The adjustment assembly 642 includes a user-control device 644 that is embodied as a thumbwheel 646 that can be turned by a user to adjust the cutting thickness of the food processor 10, as described in greater detail below.

The base 612 houses a motor 14 and a control unit. A bowl 20 may be secured to the base 612, and a lid (not shown) may be secured to the bowl 20. Collectively, the lid and the bowl 20 define a processing chamber 26. Under the control of the control unit, the motor 14 drives a cutting assembly, such as, for example, the cutting assembly 16, which was described above in reference to FIGS. 1-6, or the cutting assembly 416, which was described above in reference to FIGS. 8 and 9, to cut food items such as cheeses, meats, fruits, and vegetables in the processing chamber 26. The base 612 also includes one or more buttons, switches, dials, or other types of controls 18.

A user operates the controls 18 to control the operation of the motor 14 and hence the food processor.

The motor 14 includes an output shaft 50 extending upwardly from the base 12. The output shaft 50 is coupled to a drive stem (not shown), which is in turn configured to be secured to the cutting assembly. As described above in reference to FIGS. 1-6, the cutting assembly includes a cutting blade and a rotating disk configured to move upwardly and downwardly relative to the cutting blade to adjust the cutting thickness of the cutting assembly.

The thickness adjustment assembly 642, like the adjustment assembly 42 of FIGS. 1-6, includes a two-piece adaptor 84 configured to be coupled to the cutting assembly and a lift device 86 supporting the adaptor 84. The lift device 86 is operable to move the adaptor 84 upwardly and downwardly relative to the base 612, and, in that way, change the position of the rotating disk of the cutting assembly relative to the cutting blade of the cutting assembly, thereby adjusting the cutting thickness.

The adjustment assembly 642 also includes a gear assembly 688 is positioned in the base 612. Similar to the gear assembly 88 described above in reference to FIGS. 1-6, the gear assembly 688 is configured to operate the lift device 86. The thumbwheel 646 is configured to operate the gear assembly 688 (and hence the lift device 86) to change the thickness of the food items produced by the food processor.

The lift device 86 of the adjustment assembly 642 includes a screw-type drive assembly that may be operated to adjust the position of the rotating disk of the cutting assembly relative to the base 12. As described above, it should be appreciated that in other embodiments the lift device may take the form of, for example, a series of ramp structures or cams that slide relative to one another to change the cutting thickness of the cutting assembly. The screw-type drive assembly includes an internally-threaded upper sleeve 140 that threadingly engages an externally-threaded lower sleeve (not shown) such that the upper sleeve 140 may be moved upwardly or downwardly relative to the base 12 by rotating the upper sleeve 140. For example, counter-clockwise rotation of the upper sleeve 140 may cause downward movement of the upper sleeve 140, while clockwise rotation of the upper sleeve 140 may cause upward movement of the upper sleeve 140.

As shown in FIG. 10, the adaptor 84 of the adjustment assembly 642, like the adaptor 84 of FIGS. 1-6, includes an upper shaft (not shown) that is secured to the cutting assembly and a lower shaft 92 that is configured to be torsionally secured to the upper shaft. The lower shaft 92 is rotatively coupled to the upper sleeve 140 of the lift device 86. In that way, when the upper shaft is secured to the lower shaft 92, the assembled adaptor 84 (and hence the cutting assembly) is permitted to rotate relative to the upper sleeve 140. The lower shaft 92 is fixed axially relative to the upper sleeve 140 such that upward and downward movement of the upper sleeve 140 causes upward and downward movement of the lower shaft 92 of the adaptor 84. As described above in reference to FIGS. 1-6, when the adaptor 84 is assembled and the cutting assembly is secured thereto, the upward and downward movement of the upper sleeve 140 is thereby translated to the cutting assembly such that the rotating disk of the cutting assembly slides relative to the cutting blade to change the cutting thickness of the cutting assembly.

As shown in FIG. 10, the adjustment assembly 642 also includes a gear assembly 688 that is configured to operate the lift device 86. The base 612 has a compartment 160 that is defined by an outer wall 162, and the gear assembly 688 is positioned in the compartment 160. The gear assembly 688 includes a drive gear 690 and a guide gear 172 that are pivotally coupled to a platform 164 of the base 612. The drive gear 690 includes a body 692 that is pivotally coupled to a platform 164 of the base 612 via a pivot pin 202. The body 692 of the gear 690 has a plurality of teeth 696 defined on at least a portion of an outer surface 698 thereof.

The guide gear 172 of the gear assembly 688 has a body 182 configured to be rotatively coupled to the platform 164. The body 182 of the gear 172 has a plurality of teeth 176 defined on an outer surface 180 thereof. A number of the teeth 696 of the drive gear 690 are interdigitated with a number of the teeth 176 of the guide gear 172 such that rotation of the drive gear 690 causes rotation of the guide gear 172.

The upper sleeve 140 of the lift device 86 is moveably coupled to the guide gear 172. The body 182 of the guide gear 172 includes an opening 184 and an inner wall 188 extending downwardly from the opening 184. A plurality of splines 192 extend inwardly from the inner wall 188 of the gear 172. The upper sleeve 140 of the lift device 86 includes an outer surface 194 that has a plurality of grooves 196 defined therein, and each groove 196 is sized to receive one of the splines 192 of the gear 172, thereby coupling the sleeve 140 to the guide gear 172. As such, rotation of the guide gear 172 causes rotation of the upper sleeve 140 relative to the lower sleeve, which results in the sleeve 140 translating upwardly or downwardly relative to the base 612.

As described above, the adjustment assembly 642 includes a thumbwheel 646 that is configured to operate the gear assembly 488 (and hence the lift device 86) to change the thickness of the food items produced by the food processor. In the illustrative embodiment, the thumbwheel 646 includes a grip 700 defined on a portion of the outer surface 698 of the drive gear 690. As shown in FIG. 10, the outer wall 162 of the base 612 has a slot 702 defined therein, and the grip 700 extends outwardly through the slot 702 such that a user may access the grip 700 to operate the gear assembly 688.

As shown in FIG. 10, the base 612 has a plurality of position markings 704 defined thereon. Each position marking 704 corresponds to an adjustment position of the adjustment assembly 642, which in turn corresponds to one of a number of preset cutting positions of the cutting assembly. The grip 700 of the control device 644 also includes an indicator 706 that may be aligned with one of the position markings 704 to indicate the present position of the adjustment assembly 642 and hence the cutting position of the cutting assembly. It should be appreciated that the base 612, like the base 12 described above in regard to FIGS. 1-6, may include a locking mechanism configured to inhibit movement of the thumbwheel 646 and thereby maintain the cutting assembly at a particular cutting position.

In use, a user operates the controls 18 to energize the motor 14 to rotate the output shaft 50. When the cutting assembly is secured the output shaft 50 via the drive stem, rotation of the output shaft 50 causes rotation of the cutting assembly. While the motor 14 is energized, the user may advance food items into the processing chamber 26 to be cut by the rotating cutting assembly.

If the user desires to change the cutting thickness during the cutting operation, the user may grasp the grip 700 and rotate the thumbwheel 646. As described above, rotation of the grip 700 causes rotation of the drive gear 690. As the drive gear 690 is rotated, the guide gear 172 is also rotated, which causes the upper sleeve 140 of the lift device 86 to rotate and translate upwardly or downwardly relative to the base 612. As described above, the vertical movement of the upper sleeve 140 moves the adaptor 84 and the rotating disk relative to the cutting blade and the base 612 while the cutting blade remains fixed vertically. In that way, the thickness of food items cut by the cutting assembly may be adjusted while the cutting assembly is driven by the motor 14.

Figure 11:
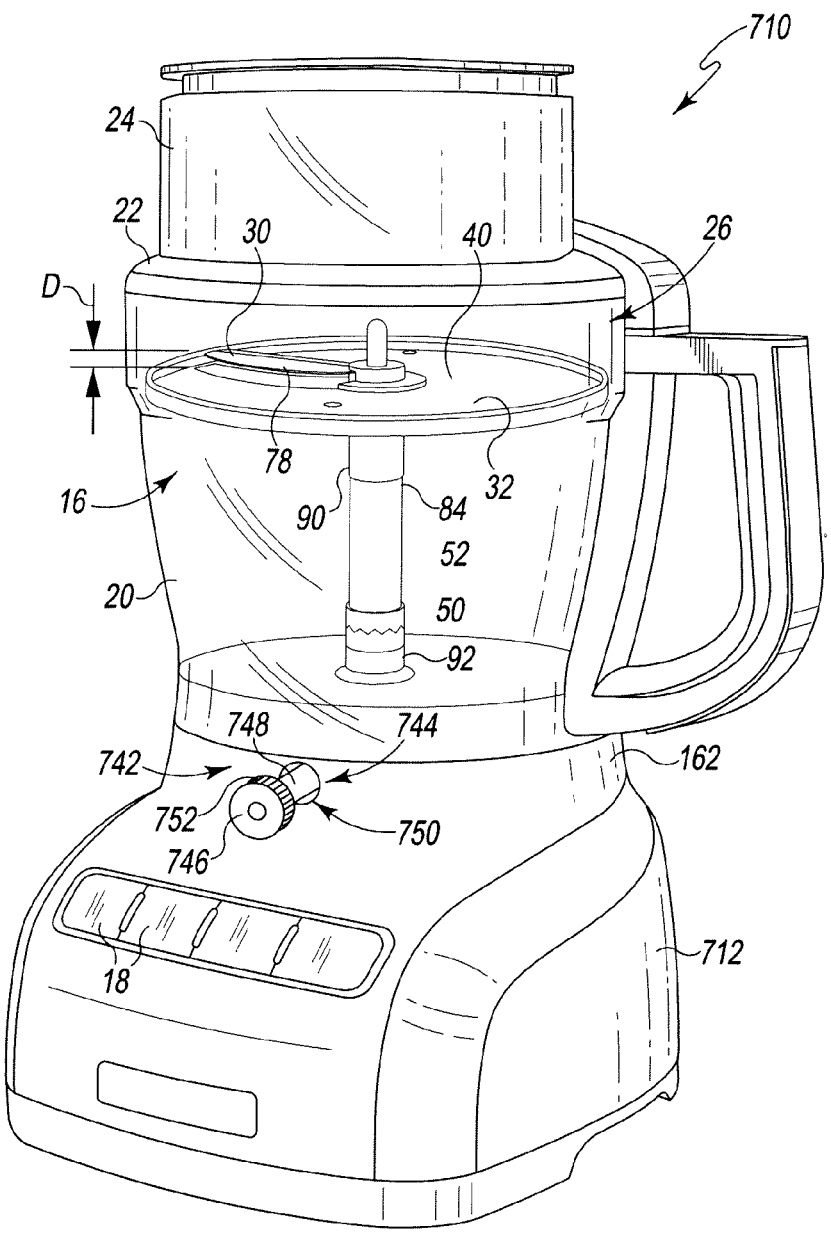
FIG. 11 is a perspective view of another embodiment of a food processor.
Figure 12:
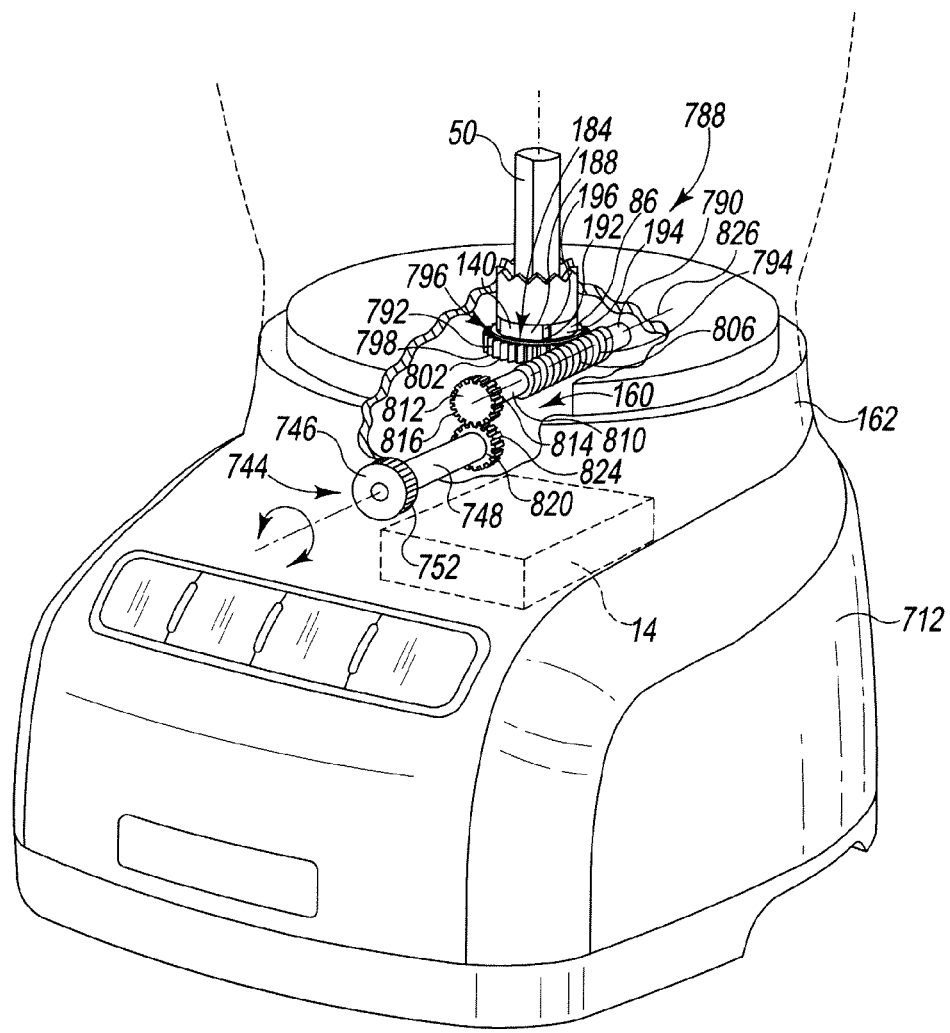
FIG. 12 is a partial cross-sectional perspective view of the food processor of FIG. 11.

Referring now to FIGS. 11 and 12, another embodiment of a food processor (hereinafter food processor 710) is shown. In the food processor 710, the base 12 described above in regard to FIGS. 1-6 has been replaced by a base 712 that houses a motor 14 and a control unit. The food processor 710, like the food processor 10 described above in regard to FIGS. 1-6, also includes a bowl 20 that is secured to the base 712 and a lid 22 that is configured to be secured to the bowl 20. Collectively, the lid 22 and the bowl 20 define a processing chamber 26.

Under the control of the control unit, the motor 14 drives a cutting assembly 16 to cut food items such as cheeses, meats, fruits, and vegetables in the processing chamber 26. In other embodiments, the food processor 710 may include another cutting assembly, such as, for example, the cutting assembly 416, which was described above in reference to FIGS. 8 and 9. The base 712 also includes one or more buttons, switches, dials, or other types of controls 18. A user operates the controls 18 to control the operation of the motor 14 and hence the food processor 710.

The cutting assembly 16 of the food processor 710 is driven by the motor 14 to cut food items. The motor 14 includes an output shaft 50 extending upwardly from the base 12. The output shaft 50 is coupled to a drive stem 52, which is in turn configured to be secured to the cutting assembly 16. As described above in reference to FIGS. 1-6, the cutting assembly 16 includes a cutting blade 30 and a rotating disk 32 configured to move upwardly and downwardly relative to the cutting blade 30 to adjust the cutting thickness of the cutting assembly 16.

The food processor 710 includes another embodiment of a thickness adjustment assembly (hereinafter adjustment assembly 742) that is operable by a user to vary the cutting thickness of the cutting assembly 16 during a cutting operation. The adjustment assembly 742 includes a user-operated control device 744 that is located outside of the processing chamber 26 of the food processor 710. In the illustrative embodiment of FIGS. 11 and 12, the control device 744 is embodied as a control knob 746 that is positioned above the controls 18 of the base 712. A shaft 748 extends inwardly from the control knob 746 through an opening 750 defined in an outer wall 162 of the base 712. The control knob 746 includes a grip 752, and a user may grasp the grip 752 to rotate the control knob 746 clockwise or counter-clockwise to change the distance D defined between a cutting edge 38 of a cutting blade 30 and an upper surface 40 of the rotating disk 32 of the cutting assembly 16.

The thickness adjustment assembly 742 also includes a two-piece adaptor 84 that is coupled to the cutting assembly 16, as shown in FIG. 11. The adaptor 84 is supported by a lift device 86, which is operable to move the adaptor 84 upwardly or downwardly relative to the base 712 of the food processor 710. As described above in reference to FIGS. 1-6, the rotating disk 32 of the cutting assembly 16 is also moved upwardly or downwardly with the adaptor 84 such that the distance D (and hence the cutting thickness) is increased or decreased. The adjustment assembly 742 also includes a gear assembly 788 positioned in the base 712. The gear assembly 788 is configured to operate the lift device 86. The control knob 746 is configured to operate the gear assembly 788 (and hence the lift device 86) to change the thickness of the food items produced by the food processor 710.

The lift device 86 of the adjustment assembly 742 includes a screw-type drive assembly that may be operated to adjust the position of the rotating disk of the cutting assembly relative to the base 12. The screw-type drive assembly includes an internally-threaded upper sleeve 140 (see FIG. 12) that threadingly engages an externally-threaded lower sleeve (not shown) such that the upper sleeve 140 may be moved upwardly or downwardly relative to the base 12 by rotating the upper sleeve 140.

As shown in FIG. 11, the adaptor 84 of the adjustment assembly 742 includes an upper shaft 90 that is secured to the rotating disk 32 of the cutting assembly 16, and a lower shaft 92 that is rotatively coupled to the upper sleeve 140 of the lift device 86. In that way, the adaptor 84 (and hence the cutting assembly) is permitted to rotate relative to the upper sleeve 140. The lower shaft 92 is fixed axially relative to the upper sleeve 140 such that upward and downward movement of the upper sleeve 140 of the lift device 86 causes upward and downward movement of the lower shaft 92 of the adaptor 84.

As shown in FIG. 12, the adjustment assembly 742 also includes a gear assembly 788 that is configured to operate the lift device 86. The base 712 has a compartment 160 that is defined by the outer wall 162, and the gear assembly 788 is positioned in the compartment 160. The gear assembly 788 includes a drive gear 790 and a guide gear 792. In the illustrative embodiment the drive gear 790 includes a worm or screw 794, and the guide gear 792 is a worm gear 796 that meshes with the screw 794.

The worm gear 796 of the gear assembly 788 has a body 798 that is rotatively coupled to the base 712. The body 798 of the gear 796 has a plurality of teeth 802 defined thereon. The screw 794 of the drive gear 790 also includes a plurality of teeth 806 that are interdigitated with a number of the teeth 802 of the worm gear 796. As a result, rotation of the drive gear 690 causes rotation of the worm gear 796.

The upper sleeve 140 of the lift device 86 is moveably coupled to the worm gear 796. As shown in FIG. 12, the body 798 of the worm gear 796 includes an opening 184 and an inner wall 188 extending downwardly from the opening 184. A plurality of splines 192 extend inwardly from the inner wall 188 of the worm gear 796. The upper sleeve 140 of the lift device 86 includes an outer surface 194 that has a plurality of grooves 196 defined therein, and each groove 196 is sized to receive one of the splines 192 of the worm gear 796, thereby coupling the sleeve 140 to the worm gear 796. As such, rotation of the worm gear 796 causes rotation of the upper sleeve 140 relative to the lower sleeve 142, which results in the sleeve 140 translating upwardly or downwardly relative to the base 712.

The gear assembly 788 also includes a drive shaft 810 connected to the screw 794. The shaft 810 has an external gear, such as, for example, a spur gear 812 attached at an end 814 thereof. As shown in FIG. 12, the spur gear 812 has a plurality of teeth 816 defined thereon. The gear assembly 788 includes another external gear, such as, for example, a spur gear 820, which is attached at an end 822 of the shaft 748 of the control device 744. The spur gear 820 has a plurality of teeth 824 defined thereon that are interdigitated with the teeth 816 of the spur gear 812 of the drive shaft 810. In that way, the control knob 746 of the control device 744 is connected to the gear assembly 788 such that rotation of the control knob 746 results in rotation of the screw 794 and the gears 796, 812, and 820.

In use, a user may operate the controls 18 to energize the motor 14 to rotate the output shaft 50. Because the cutting assembly 16 is secured the output shaft 50 via the drive stem 52, rotation of the output shaft 50 causes rotation of the cutting assembly 16. While the motor 14 is energized, the user may advance food items into the processing chamber 26 to be cut by the rotating cutting assembly.

If the user desires to change the cutting thickness during the cutting operation, a user may grasp the grip 752 of the control knob 746 and rotate the control knob 746 clockwise or counter-clockwise while the cutting assembly 16 is driven by the motor 14. As the control knob 746 is rotated, the spur gear 820 on the shaft 748 acts on the spur gear 812 of the drive gear 790 to rotate the drive gear 790 about its longitudinal axis 826. Rotation of the drive gear 790 causes the screw 794 to act on the worm gear 796, which results in rotation of the worm gear 796. As described above, rotation of the worm gear 796 causes rotation of the upper sleeve 140, and the sleeve 140 (and hence the adaptor 84 and the rotating disk 32) translates upwardly or downwardly relative to the base 712. In that way, the distance D defined between a cutting edge 38 of a cutting blade 30 and an upper surface 40 of the rotating disk 32 of the cutting assembly 16 may be changed, resulting in thicker or thinner food items.

It should be appreciated that the food processor 710 may include one or position markings that correspond to preset cutting positions for the cutting assembly 16. It should also be appreciated that the food processor 710, like the food processor 10 described above in regard to FIGS. 1-6, may include a locking mechanism configured to inhibit movement of the control knob 746 and thereby maintain the cutting assembly 16 at a particular cutting position. In other embodiments, the gear assembly may include other gear arrangements to translate the rotation of the control knob 746 into movement of the rotating disk. For example, referring now to FIG. 13, another embodiment of a gear assembly (hereinafter gear assembly 888) is shown.

Similar to the gear assembly 788, the gear assembly 888 is configured to operate the lift device 86. The gear assembly 888 is positioned in the compartment 160 of the base 712, and the gear assembly 888 includes a guide gear 890, a rack gear 892, and a pinion gear 894 that are moveably coupled to the base 712. The guide gear 890 of the gear assembly 888 has a body 182 configured to be rotatively coupled to the base 712. The body 182 of the gear 890 has a plurality of teeth 176 defined on an outer surface 180 thereof.

Figure 13:
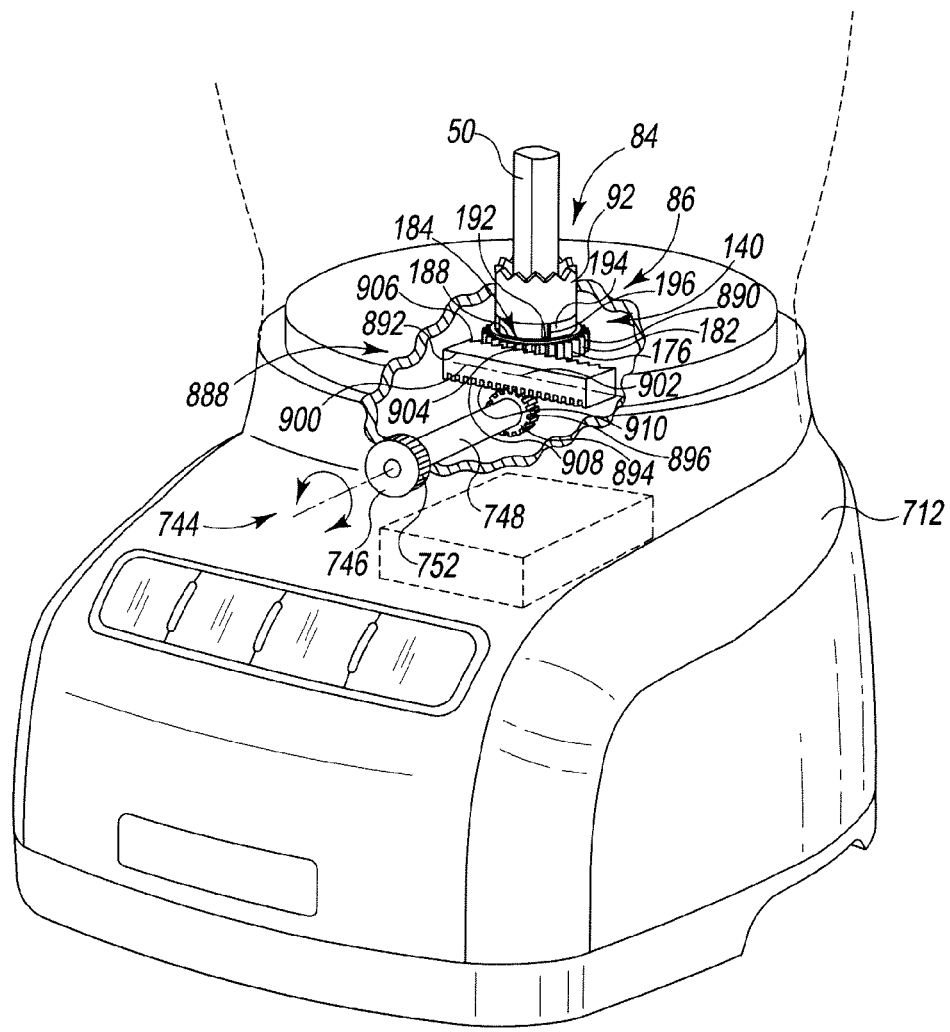
FIG. 13 is a partial cross-sectional perspective view of another embodiment of a base for the food processor of FIG. 11.

As shown in FIG. 13, the upper sleeve 140 of the lift device 86 is moveably coupled to the guide gear 890. The body 182 of the guide gear 890 includes an opening 184 and an inner wall 188 extending downwardly from the opening 184. A plurality of splines 192 extend inwardly from the inner wall 188 of the gear 890. The upper sleeve 140 of the lift device 86 includes an outer surface 194 that has a plurality of grooves 196 defined therein, and each groove 196 is sized to receive one of the splines 192 of the gear 890, thereby coupling the sleeve 140 to the guide gear 890. As such, rotation of the guide gear 890 causes rotation of the upper sleeve 140 relative to the lower sleeve 142, which results in the sleeve 140 translating upwardly or downwardly relative to the base 712.

As described above, the external control device 744 of the food processor 710 includes a control knob 746 and a shaft 748 extending inwardly from the control knob 746 into the base 712. The shaft 748 has the pinion gear 894 of the gear assembly 888 secured at an end 822 thereof. The pinion gear 894 is an external gear that has a plurality of teeth 896 defined on an outer surface thereof.

The pinion gear 894 of the gear assembly 888 meshes with the rack gear 892. The rack gear 892 includes a rectangular body 900 that is configured to slide along a longitudinal axis 902. The rack gear 892 has a plurality of teeth 904 defined on one side 906 of the body 900 and another plurality of teeth 908 defined on a bottom side 910. As shown in FIG. 13, a number of the teeth 904 of the rack gear 892 are interdigitated with a number of the teeth 176 of the guide gear 890. Additionally, a number of the teeth 908 of the rack gear 892 are interdigitated with a number of the teeth 896 of the pinion gear 894. As a result, when the pinion gear 894 is rotated, the rack gear 892 is moved along the axis 902, thereby causing the guide gear 890 to rotate such that the upper sleeve 140 rotates and translates upwardly or downwardly relative to the base 712.

In use, while the cutting assembly is driven by the motor 14, a user may grasp the grip 752 of the control knob 746 and rotate the control knob 746 clockwise or counter-clockwise while the cutting assembly 16 is driven by the motor 14. As the control knob 746 is rotated, the pinion gear 894 of the gear assembly 888 is rotated. Rotation of the pinion gear 894 causes the rack gear 892 to slide along the axis 902 and thereby rotate the guide gear 890. As described above, rotation of the guide gear 890 causes rotation of the upper sleeve 140, and the sleeve 140 (and hence the adaptor 84 and the rotating disk 32) translates upwardly or downwardly relative to the base 712. In that way, the distance D defined between a cutting edge 38 of a cutting blade 30 and an upper surface 40 of the rotating disk 32 of the cutting assembly 16 may be changed, resulting in thicker or thinner food items.

Figure 14:
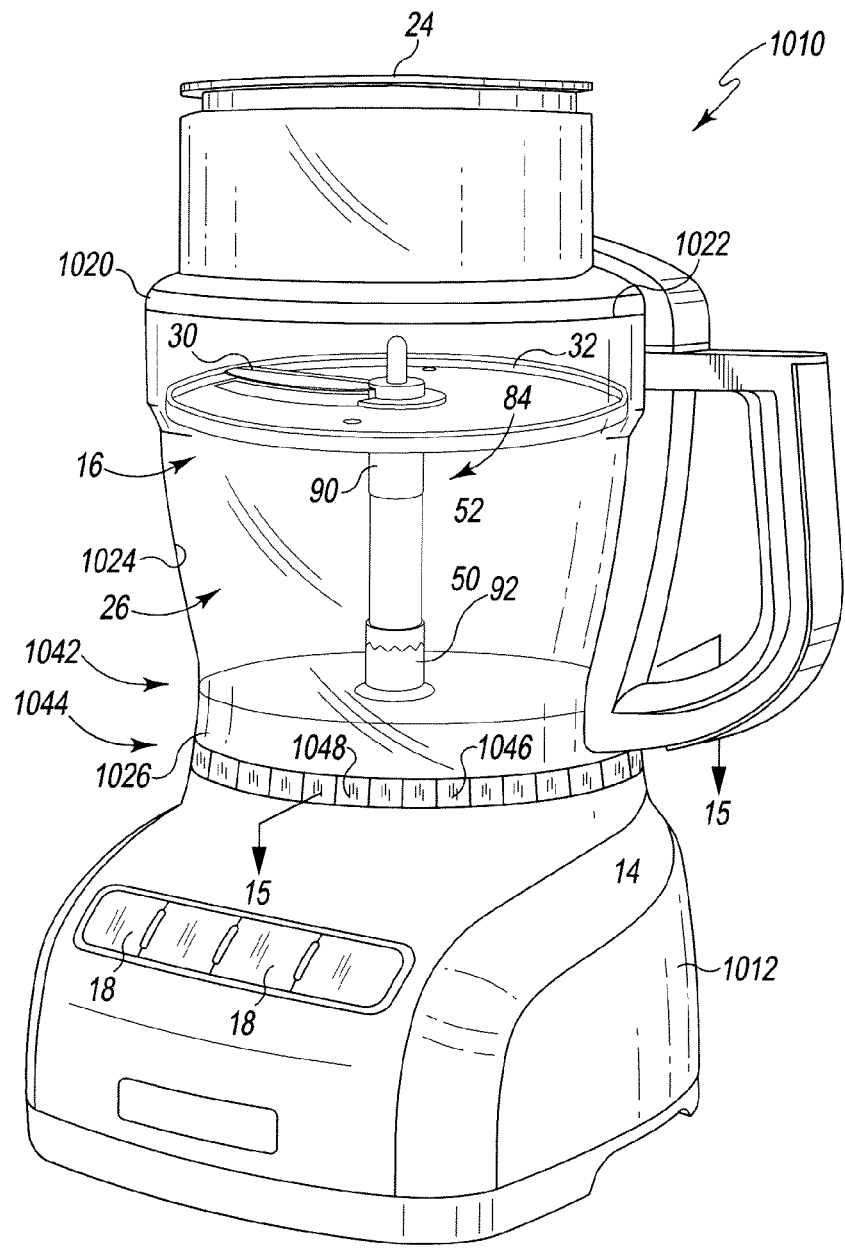
FIG. 14 is a perspective view of another embodiment of a food processor.
Figure 15:
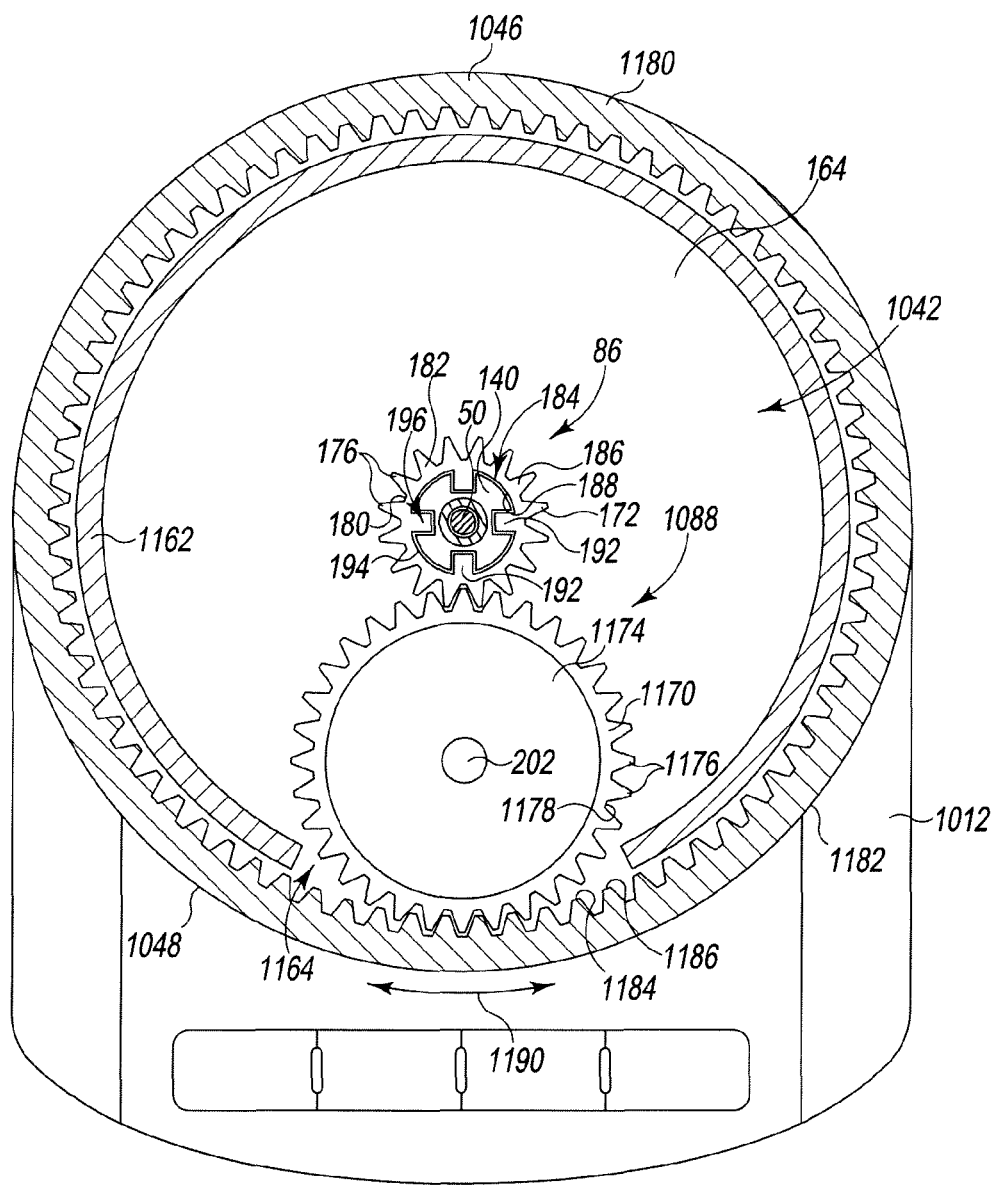
FIG. 15 is a cross-sectional top plan view of the food processor of FIG. 14.

Referring now to FIGS. 14 and 15, another embodiment of a food processor (hereinafter food processor 1010) is shown. In the food processor 1010, the base 12 and the bowl 20 described above in regard to FIGS. 1-6 have been replaced by a base 1012 and a bowl 1020 that includes another embodiment of a thickness adjustment assembly (hereinafter adjustment assembly 1042). The adjustment assembly 1042 includes a user-control device 1044 that is embodied as a control strip 1046 rotatively coupled to the bowl 1020. The strip 1046 includes a grip 1048 that can be operated by a user to adjust the cutting thickness of the food processor 1010, as described in greater detail below.

The base 1012 of the food processor 1010 houses a motor 14 and a control unit. Under the control of the control unit, the motor 14 drives a cutting assembly 16 to cut food items such as cheeses, meats, fruits, and vegetables. The base 1012 also includes one or more buttons, switches, dials, or other types of controls 18. A user operates the controls 18 to control the operation of the motor 14 and hence the food processor 1010.

The removable receptacle or bowl 1020 is secured to the base 1012 and has a removable lid 22 secured thereto. The bowl 1020 has an upper rim 1022 and an inner wall 1024 that extends downwardly from the upper rim 1022 to define part of a processing chamber 26 where food items may be processed by the cutting assembly 16. The removable lid 22 is secured to the rim 1022 of the bowl 1020. In that way, the removable lid 22 and the bowl 1020 cooperate to define the processing chamber 26.

The bowl 1020 of the food processor 1010 has a lower rim 1026 that is positioned below the processing chamber 26. The strip 1046 of the control device 1044 is attached to the lower rim 1026, and is configured to rotate relative to the lower rim 1026. In the illustrative embodiment, a portion of the strip 1046 is received in a track (not shown) defined in the lower rim 1026 such that the strip 1046 is rotatively coupled to the bowl 1020. It should be appreciated that in other embodiments the strip 1046 may be secured to the bowl 1020 by any combination of pins, tabs, slots, or openings that permit the strip 1046 to rotate relative to the bowl 1020. It should also be appreciated that in other embodiments the control strip may be rotatively coupled to the base rather than the bowl or may be a separate component.

The cutting assembly 16 of the food processor 1010 is driven by the motor 14 to cut food items. The motor 14 includes an output shaft 50 extending upwardly from the base 12. The output shaft 50 is coupled to a drive stem 52, which is in turn configured to be secured to the cutting assembly 16. As described above in reference to FIGS. 1-6, the cutting assembly 16 includes a cutting blade 30 and a rotating disk 32 configured to move upwardly and downwardly relative to the cutting blade 30 to adjust the cutting thickness of the cutting assembly 1016.

As shown in FIGS. 14 and 15, the adjustment assembly 1042 of the food processor 1010 includes a two-piece adaptor 84 coupled to the cutting assembly 16, a lift device 86 supporting the adaptor 84 and the cutting assembly 16, and a gear assembly 1088 positioned in the base 1012. The lift device 86 is operable to move the adaptor 84 upwardly and downwardly relative to the base 1012, and, in that way, change the thickness of food items cut by the cutting assembly. The gear assembly 1088 is configured to operate the lift device 86, and the control strip 1046 is configured to operate the gear assembly 1088 (and hence the lift device 86) to change the thickness of the food items produced by the food processor 1010.

The lift device 86 of the adjustment assembly 1042 includes a screw-type drive assembly that may be operated to adjust the position of the rotating disk of the cutting assembly relative to the base 1012. The screw-type drive assembly includes an internally-threaded upper sleeve 140 that threadingly engages an externally-threaded lower sleeve (not shown) such that the upper sleeve 140 may be moved upwardly or downwardly relative to the base 1012 by rotating the upper sleeve 140.

As shown in FIG. 14, the adaptor 84 of the adjustment assembly 1042 includes an upper shaft 90 that is secured to the rotating disk 32 of the cutting assembly 16, and a lower shaft 92 that is rotatively coupled to the upper sleeve 140 of the lift device 86. In that way, the adaptor 84 (and hence the cutting assembly) is permitted to rotate relative to the upper sleeve 140. The lower shaft 92 is fixed axially relative to the upper sleeve 140 such that upward and downward movement of the upper sleeve 140 of the lift device 86 causes upward and downward movement of the lower shaft 92 of the adaptor 84.

As shown in FIG. 15, the adjustment assembly 1042 also includes a gear assembly 1088 that is configured to operate the lift device 86. The base 1012 has a compartment 160 that is defined by an outer wall 1162, and the gear assembly 1088 is positioned in the compartment 160. The gear assembly 1088 includes a drive gear 1170 and a guide gear 172 that are pivotally coupled to a platform 164 of the base 1012. A slot 1164 is defined in the outer wall 1162 of the base 1012, and the drive gear 1170 includes a body 1174 that is partially positioned in the slot 1164. The body 1174 of the drive gear 1170 is pivotally coupled to a platform 164 of the base 1012 via a pivot pin 202. The body 1174 also has a plurality of teeth 1176 defined on an outer surface 1178 thereof.

The guide gear 172 of the gear assembly 1088 has a body 182 that is configured to be rotatively coupled to the platform 164. The body 182 of the gear 172 has a plurality of teeth 176 defined on an outer surface 180 thereof. A number of the teeth 1176 of the drive gear 1170 are interdigitated with a number of the teeth 176 of the guide gear 172 such that rotation of the drive gear 1170 causes rotation of the guide gear 172.

The upper sleeve 140 of the lift device 86 is moveably coupled to the guide gear 172. The body 182 of the guide gear 172 includes an opening 184 defined in an upper surface 186 and an inner wall 188 extending downwardly from the opening 184. A plurality of splines 192 extend inwardly from the inner wall 188 of the gear 172. The upper sleeve 140 of the lift device 86 includes an outer surface 194 that has a plurality of grooves 196 defined therein, and each groove 196 is sized to receive one of the splines 192 of the gear 172, thereby coupling the sleeve 140 to the guide gear 172. As such, rotation of the guide gear 172 causes the rotation of the upper sleeve 140 relative to the lower sleeve 142, which results in the sleeve 140 translating upwardly or downwardly relative to the base 1012.

As shown in FIG. 15, the control strip 1046 includes a ring body 1180 that extends around the outer circumference of the wall 1162. The ring body 1180 has an outer surface 1182 and an inner surface 1184 positioned opposite the outer surface 1182. A plurality of teeth 1186 are defined on the inner surface 1184, and a number of the teeth 1186 are interdigitated with a number of the teeth 1176 of the drive gear 1170. As such, rotation of the control strip 1046 in either direction indicated by arrow 1190 causes the rotation of the drive gear 1170 and the guide gear 172. The grip 1048 of the control strip 1046 is defined on the outer surface 1182 of the ring body 1180, and, as described above, the grip 1048 may be utilized by a user to operate the adjustment assembly 1042.

In use, a user may operate the controls 18 to energize the motor 14 to rotate the output shaft 50. Because the cutting assembly 16 is secured the output shaft 50 via the drive stem 52, rotation of the output shaft 50 causes rotation of the cutting assembly. While the motor 14 is energized, the user may advance food items into the processing chamber 26 to be cut by the rotating cutting assembly.

To adjust the cutting thickness while the cutting assembly 16 is driven by the motor 14, the user may grasp the grip 1048 to rotate the control strip 1046. The control strip 1046 acts on the drive gear 1170 and thereby causes the drive gear 1170 to begin rotating. The rotation of the drive gear 1170 causes the rotation of the guide gear 172, which results in the upper sleeve 140 of the lift device 86 to rotate and translate upwardly or downwardly relative to the base 1012. As described above, the vertical movement of the upper sleeve 140 moves the adaptor 84 and the rotating disk 32 relative to the base 612 while the cutting blade 30 remains fixed vertically. In that way, the thickness of food items cut by the cutting assembly may be adjusted while the cutting assembly is driven by the motor 14.

It should be appreciated that the food processor 1010 may include a locking mechanism similar to the locking mechanism 220 described above in reference to FIGS. 1-6, which is configured to inhibit movement of the control strip 1046 and thereby maintain the cutting assembly 16 at a particular cutting position. Additionally, it should also be appreciated that the bowl or base may include one or more locating features to guide a user in properly positioning the bowl on the base. The food processor 1010 may also include position markings that indicate the cutting thickness of the cutting assembly 16.

Referring now to FIGS. 16-19, another embodiment of a food processor (hereinafter food processor 1210) is shown. The food processor 1210 includes another embodiment of a base (hereinafter base 1212) and another embodiment of a bowl (hereinafter bowl 1220). The food processor 1210 also includes another embodiment of a thickness adjustment assembly (hereinafter adjustment assembly 1242) that is operable to change the thickness of cut food items produced by the food processor 1210. To operate the adjustment assembly 1242, a user rotates the bowl 1220 about an axis 1222 relative to the base 1212, as described in greater detail below.

The base 1212, like the base 12 described above in reference to FIGS. 1-6, houses a motor 14 and a control unit. Under the control of the control unit, the motor 14 drives a cutting assembly to cut food items such as cheeses, meats, fruits, and vegetables. The cutting assembly may be, for example, the cutting assembly 16, which was described above in reference to FIGS. 1-6, or the cutting assembly 416, which was described above in reference to FIGS. 8 and 9.

Figure 16:
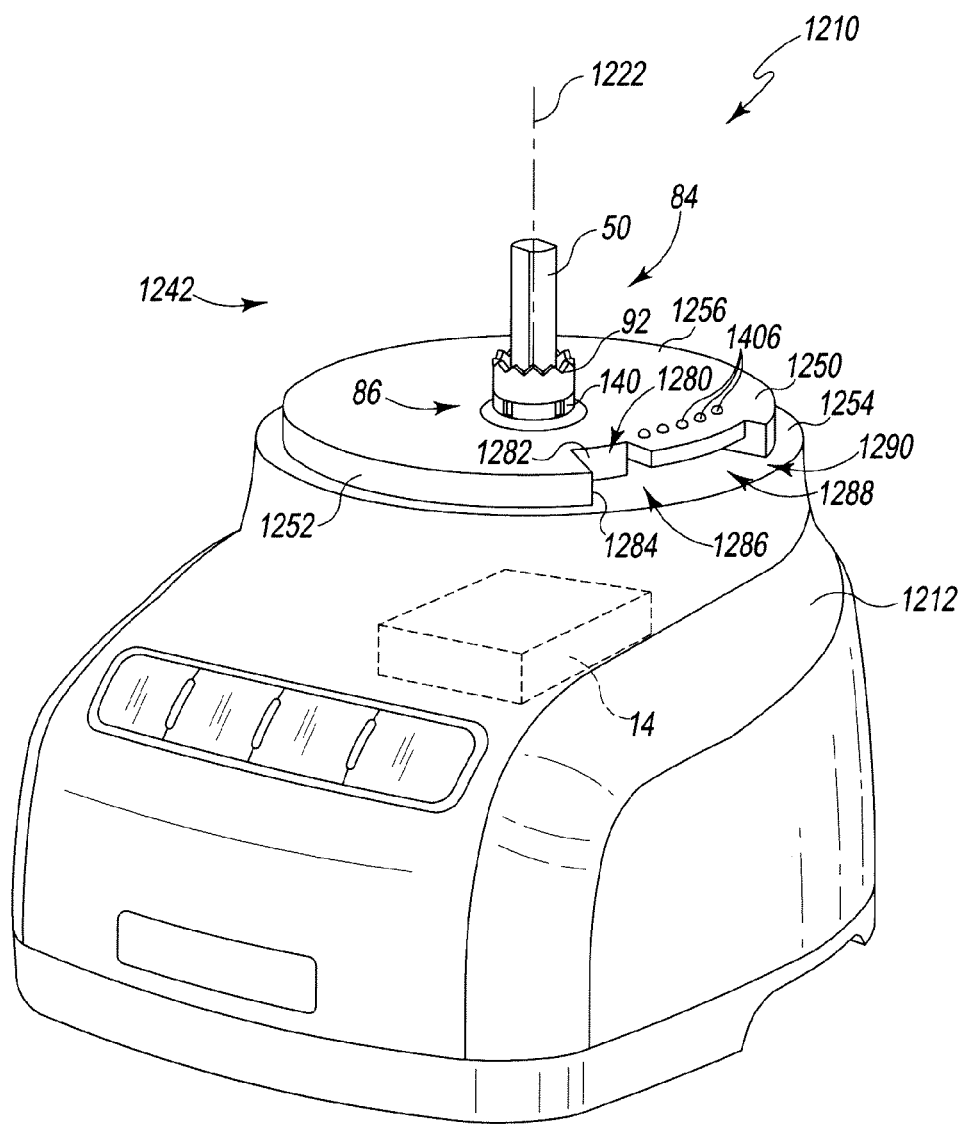
FIG. 16 is a perspective view of another embodiment of a food processor showing another embodiment of a base.

The base 1212 of the food processor 1210 includes one or more buttons, switches, dials, or other types of controls 18. A user operates the controls 18 to control the operation of the motor 14 and hence the food processor 1210. The motor 14 includes an output shaft 50 that is configured to be coupled to a drive stem (not shown), which is in turn configured to be secured to the cutting assembly. In that way, driving force generated by the motor 14 may be transferred to the cutting assembly. As shown in FIG. 16, the base 1212 also includes a mounting platform 1250 configured to receive the bowl 1220 thereon, and the output shaft 50 extends upwardly from the mounting platform 1250. The mounting platform 1250 has an outer wall 1252 that extends upwardly from a rim surface 1254 of the base 1212 and an upper surface 1256.

Figure 17:
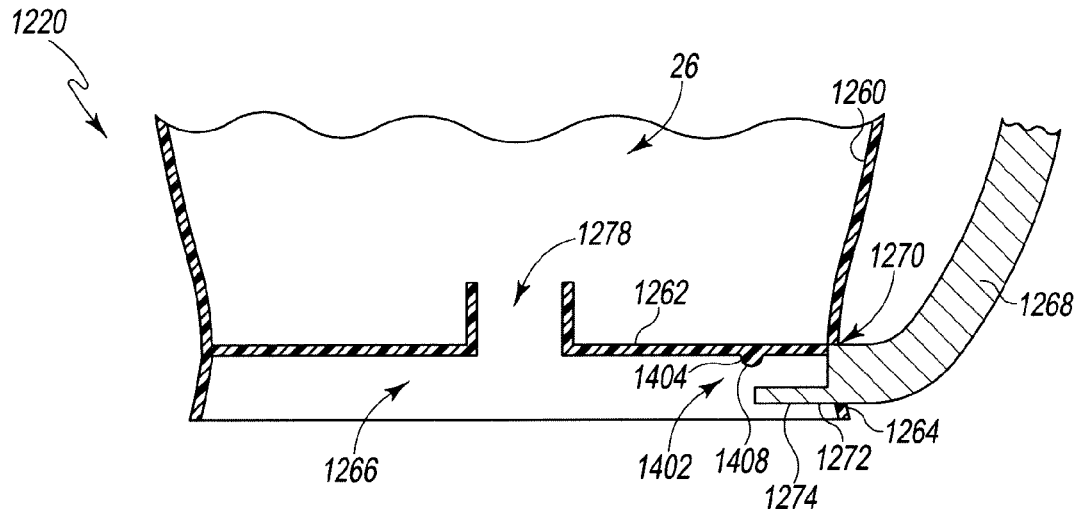
FIG. 17 is a cross-sectional side elevation view of another embodiment of a removable bowl for use with the base of FIG. 16.
Figure 18:
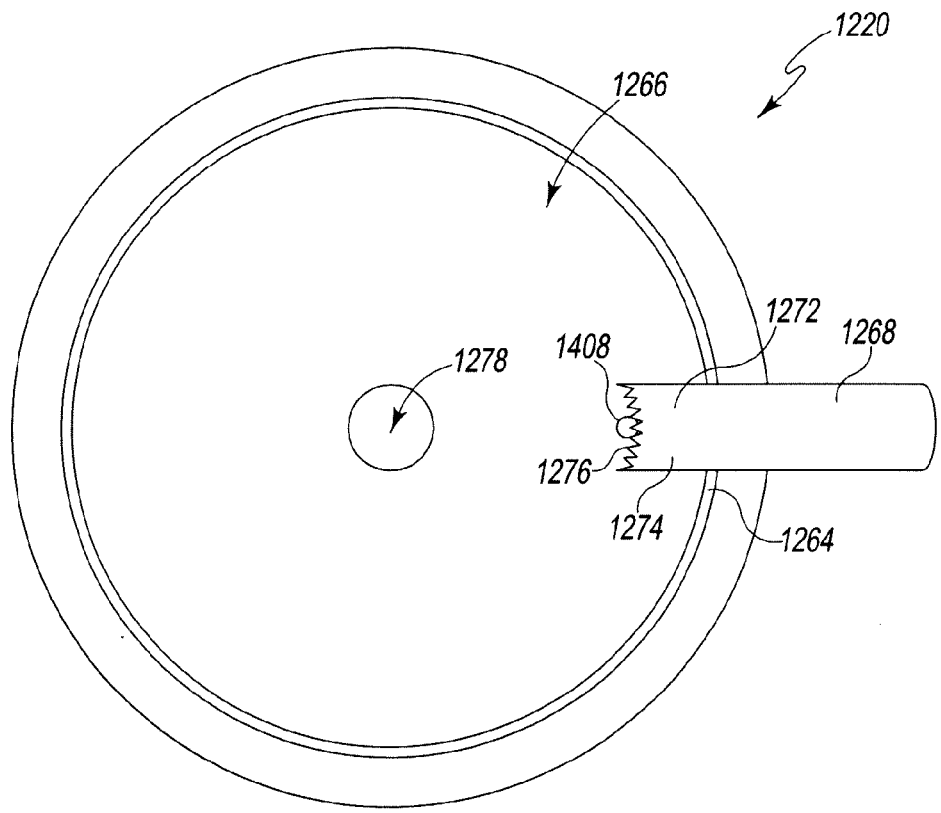
FIG. 18 is a bottom plan view of the removable bowl of FIG. 17.

As shown in FIGS. 17 and 18, the bowl 1220 of the food processor 1210 has an inner wall 1260 that extends downwardly from an upper rim (not shown) to a bottom wall 1262. The inner wall 1260 and the bottom wall 1262 cooperate to define part of a processing chamber 26 where food items may be processed by the cutting assembly. A removable lid, such as, for example, the lid 22 described above in reference to FIGS. 1-6, may be secured to the bowl 1220. Collectively, the lid 22 and the bowl 1220 cooperate to define the processing chamber 26. The bottom wall 1262 also includes an opening 1278 sized such that the output shaft 50 and part of the adjustment assembly 1242 may extend therethough.

The bowl 1220 also includes a lower wall 1264 that is positioned below the processing chamber 26. The lower wall 1264 and the bottom wall 1262 define a lower chamber 1266 that is sized to receive the mounting platform 1250 of the base 1212. The bowl 1220 has a handle 1268 that facilitates placement of the bowl 1220 on the base 12, and the handle 1268 is received in an opening 1270 defined in the lower wall 1264. The handle 1268 has an arm 1272 that extends inwardly from the lower wall 1264 to an end 1274. As shown in FIG. 18, the end 1274 of the arm 1272 has a plurality of teeth 1276 defined thereon.

Returning to FIG. 16, the upper surface 1256 of the mounting platform 1250 has an opening 1280 defined therein Inner walls 1282, 1284 extend downwardly from the opening 1280 to define a pocket 1286 in the mounting platform 1250. The pocket 1286 is sized to receive the arm 1272 of the bowl 1220. The mounting platform 1250 also has a track 1288 defined in the outer wall 1252, and the track 1288 is similarly sized to receive the arm 1272. As shown in FIG. 16, the track 1288 is connected to the pocket 1286, and the pocket 1286 and the track 1288 cooperate to form a slot 1290 in the mounting platform 1250.

The thickness adjustment assembly 1242, like the adjustment assembly 42 of FIGS. 1-6, includes a two-piece adaptor 84 configured to be coupled to the cutting assembly and a lift device 86 supporting the adaptor 84. The lift device 86 is operable to move the adaptor 84 upwardly and downwardly relative to the base 612, and, in that way, change the position of the rotating disk of the cutting assembly relative to the cutting blade of the cutting assembly, thereby adjusting the cutting thickness.

The adjustment assembly 1242 of the food processor 1210 also includes a gear assembly 1388 positioned in the base 1212 Similar to the gear assembly 88 described above in reference to FIGS. 1-6, the gear assembly 1388 is configured to operate the lift device 86 to lower and raise the adaptor 84. The bowl 1220 is configured to engage the gear assembly 1388 so that a user may change the thickness of the food items produced by the food processor 1010 while the cutting assembly is driven by the motor 14.

The lift device 86 of the adjustment assembly 1242 includes a screw-type drive assembly that may be operated to adjust the position of the rotating disk of the cutting assembly relative to the cutting blade and to the base 12. The screw-type drive assembly includes an internally-threaded upper sleeve 140 that threadingly engages an externally-threaded lower sleeve (not shown) such that the upper sleeve 140 may be moved upwardly or downwardly relative to the base 1212 by rotating the upper sleeve 140.

As shown in FIG. 16, the adaptor 84 of the adjustment assembly 1242 includes an upper shaft (not shown) that is secured to the cutting assembly and a lower shaft 92 that is configured to be torsionally secured to the upper shaft. The lower shaft 92 is rotatively coupled to the upper sleeve 140 of the lift device 86. In that way, when the upper shaft is secured to the lower shaft 92, the assembled adaptor 84 (and hence the cutting assembly) is permitted to rotate relative to the upper sleeve 140. The lower shaft 92 is fixed axially relative to the upper sleeve 140 such that upward and downward movement of the upper sleeve 140 causes upward and downward movement of the lower shaft 92 of the adaptor 84. As described above in reference to FIGS. 1-6, when the adaptor 84 is assembled and the cutting assembly is secured thereto, the upward and downward movement of the upper sleeve 140 is thereby translated to the cutting assembly such that the rotating disk of the cutting assembly slides relative to the cutting blade to change the cutting thickness of the cutting assembly.

Figure 19:
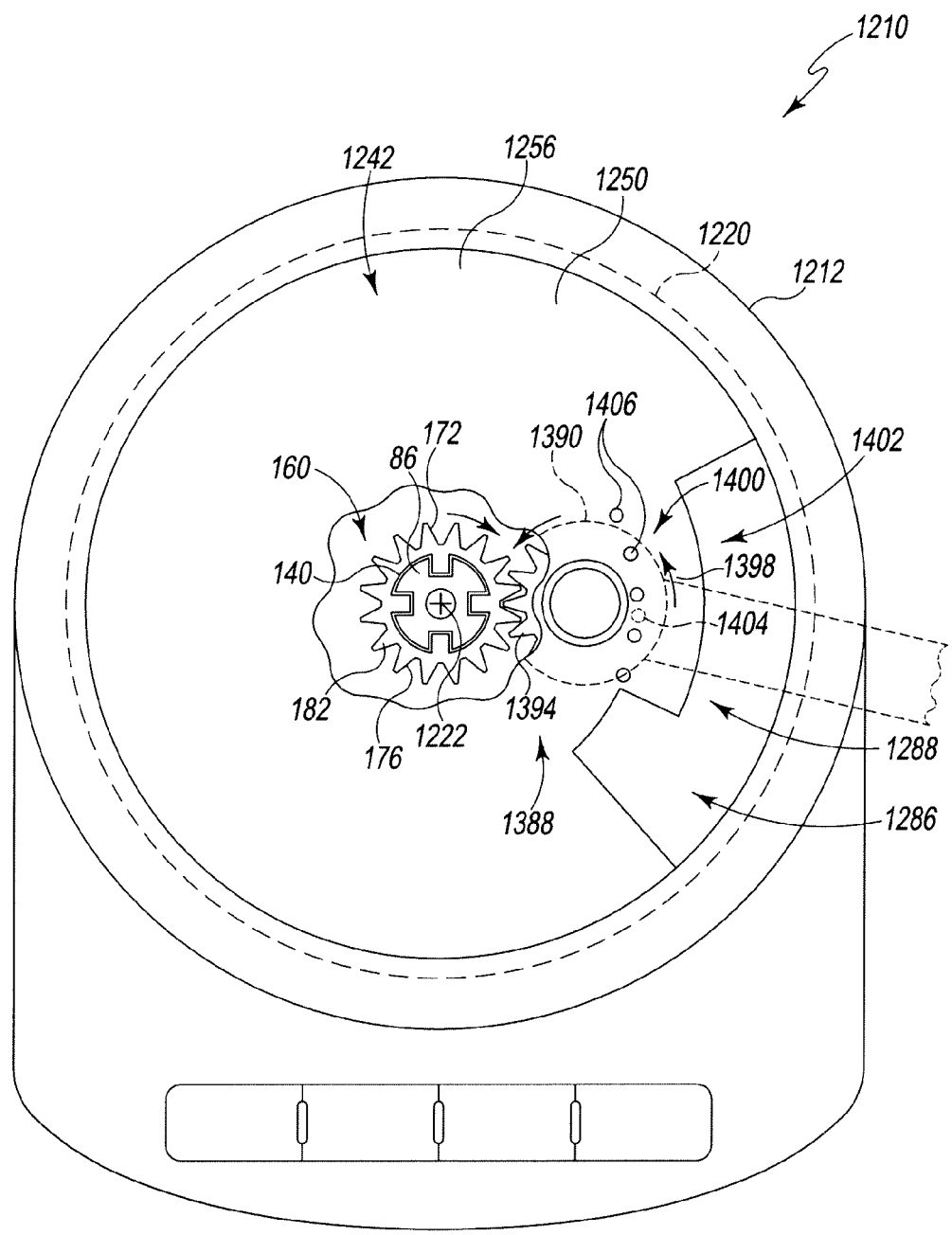
FIG. 19 is a top plan view of the removable bowl of FIG. 17 attached to the base of FIG. 16.

As shown in FIG. 19, the adjustment assembly 1242 also includes a gear assembly 1388 that is configured to operate the lift device 86. The base 1212 has a compartment 160, and the gear assembly 1388 is positioned in the compartment 160. The gear assembly 1388 includes a drive gear 1390 and a guide gear 172 that are pivotally coupled to the base 1212. The drive gear 1390 includes a body 1392 that has a plurality of teeth 1394 defined thereon.

The guide gear 172 of the gear assembly 1388 has a body 182 configured to be rotatively coupled to the base 1212. The body 182 of the gear 172 has a plurality of teeth 176 defined on an outer surface 180 thereof. A number of the teeth 1394 of the drive gear 1390 are interdigitated with a number of the teeth 176 of the guide gear 172 such that rotation of the drive gear 1390 causes rotation of the guide gear 172.

As in the embodiment of FIGS. 1-6, the upper sleeve 140 of the lift device 86 is moveably coupled to the guide gear 172 such that rotation of the guide gear 172 causes rotation of the upper sleeve 140 relative to the lower sleeve 142. As described above, the rotation of the sleeve 140 results in the sleeve 140 translating upwardly or downwardly relative to the base 1212.

As shown in FIGS. 16-19, the food processor 1210 also includes a locking mechanism 1400 configured to inhibit movement of the bowl 1220 relative to the base 1212 and thereby maintain the cutting assembly in a particular cutting position. In the illustrative embodiment, the locking mechanism 1400 is embodied as a detent device 1402. As shown in FIGS. 17 and 18, the detent device 1402 includes a pin 1404 that extends downwardly from the bottom wall 1262 of the bowl 1220 and, as shown in FIG. 16, a plurality of notches 1406 that are defined in the upper surface 1256 of the base 1212. Each notch 1406 corresponds to a preset cutting position of the cutting assembly, and the convex lower end 1408 of the pin 1404 is configured to be received in each of the notches 1406 as the bowl 1220 is rotated about the axis 1222.

In use, a user may align the arm 1272 of the bowl 1220 with the opening 1280 of the base 1212. The bowl 1220 may be advanced downward such that the arm 1272 is received in the pocket 1286 and the lower wall 1264 of the bowl 1220 is advanced into contact with the rim surface 1254 of the base 1212. When the arm 1272 is positioned in the pocket 1286, the teeth 1276 of the arm 1272 are spaced apart from and not in contact with the teeth 1394 of the drive gear 1390. The user may grasp the handle 1268 and rotate the bowl 1220 in the direction indicated by arrow 1398 so that the arm 1272 is advanced into the track 1288. As the bowl 1220 is rotated, the teeth 1276 of the arm 1272 mesh with a number of the teeth 1394 of the drive gear 1390, thereby rotating the drive gear 1390. The rotation of the drive gear 1390 causes the guide gear 172 to rotate. As described above, rotation of the guide gear 172 causes downward movement of the upper sleeve 140. When the bowl 1220 is rotated to one of the preset positions, the convex lower end 1408 of the pin 1404 is received the notch 1406 corresponding to that position, and further movement of the bowl 1220 is inhibited.

A user may operate the controls 18 to energize the motor 14 to rotate the output shaft 50. Because the cutting assembly is secured the output shaft 50 via the drive stem, rotation of the output shaft 50 causes rotation of the cutting assembly. While the motor 14 is energized, the user may advance food items into the processing chamber 26 to be cut by the rotating cutting assembly.

If the user desires to change the cutting thickness during the cutting operation, the user may lift the bowl 1220 to remove the pin 1404 from that notch 1406 and then rotate the bowl 1220 to the next position. As the bowl 1220 is rotated, the teeth 1276 of the arm 1272 mesh with a number of the teeth 1394 of the drive gear 1390, thereby rotating the drive gear 1390. The rotation of the drive gear 1390 causes the guide gear 172 to rotate. As described above, rotation of the guide gear 172 causes movement of the upper sleeve 140 upwardly or downwardly and changes the thickness of food items being processed by the food processor 1210.

Figure 20:
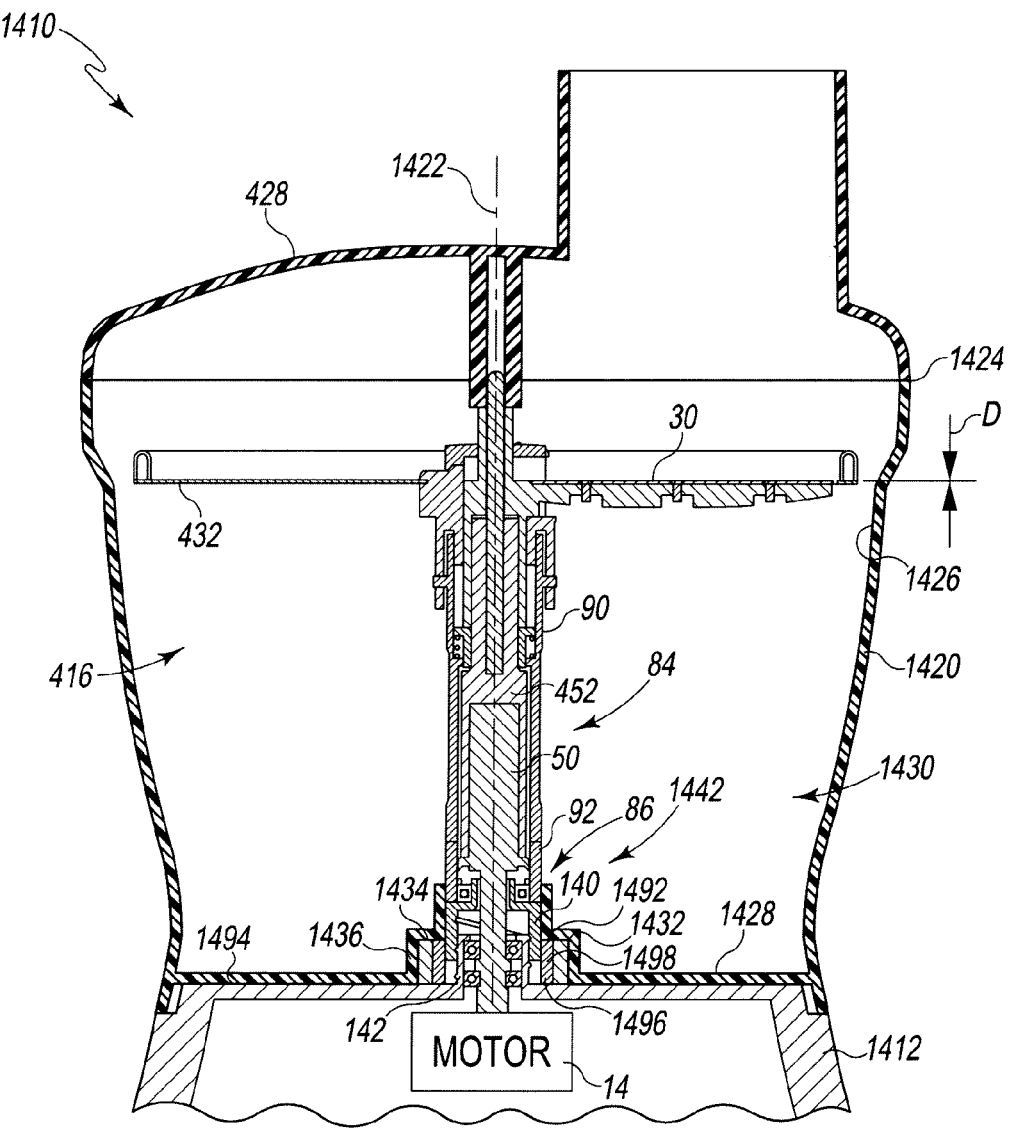
FIG. 20 is a cross-sectional elevation view of another embodiment of a food processor.

Referring now to FIG. 20, another embodiment of a food processor (hereinafter food processor 1410) is shown. The food processor 1410 includes the cutting assembly 416 and the removable lid 428, which were described above in reference to FIGS. 8 and 9. The food processor also includes another embodiment of a base (hereinafter base 1412) and a removable bowl (hereinafter bowl 1420). The food processor 1410 includes another embodiment of a thickness adjustment assembly (hereinafter adjustment assembly 1442) that is operable to change the thickness of cut food items produced by the food processor 1210. To operate the adjustment assembly 1442, a user rotates the bowl 1420 about an axis 1422 relative to the base 1412, as described in greater detail below.

The base 1412 houses a motor 14 and a control unit (not shown). Under the control of the control unit, the motor 14 drives the cutting assembly 416 to cut food items such as cheeses, meats, fruits, and vegetables. The bowl 1420 is rotatively coupled to the base 12. The bowl 20 has an upper rim 1424 and an inner wall 1426 that extends downwardly from the upper rim 1424 to a bottom wall 1428 to define part of a processing chamber 1430 where food items may be processed by the cutting assembly 416. The removable lid 428 is secured to the rim 1424 of the bowl 1420. In that way, the removable lid 428 and the bowl 1420 cooperate to define the processing chamber 1430.

As shown in FIG. 20, the bowl 1420 also includes an inner wall 1432 that defines a cavity 1434 below the processing chamber 1430. An external gear 1436 is secured to the inner wall 1432 of the bowl 1420. The external gear 1436 has a plurality of teeth (not shown) defined on an inner surface (not shown).

As described above, the cutting assembly 416 of the food processor 1410 is driven by the motor 14 to cut food items. The motor 14 includes an output shaft 50 extending upwardly from the base 1412. The output shaft 50 is coupled to a drive stem 452, which is in turn configured to be secured to the cutting assembly 416. As described above in reference to FIGS. 8 and 9, the cutting assembly 416 includes a cutting blade 30 and a rotating disk 432 configured to slide vertically relative to the cutting blade 30.

The food processor 1410 also includes a thickness adjustment assembly 1442, which is operable to move the rotating disk 432 relative to the cutting blade 30. The adjustment assembly 1442 includes a two-piece adaptor 84, a lift device 86 supporting the adaptor 84 and the rotating disk 432, and a gear assembly 1488 attached to the base 1412. The lift device 86 is operable to move the adaptor 84 (and hence rotating disk 432) upwardly and downwardly relative to the base 1412 of the food processor 1410, and the gear assembly 1488 is configured to operate the lift device 86.

The lift device 86 of the adjustment assembly 1442 includes a screw-type drive assembly that may be operated to adjust the position of the rotating disk of the cutting assembly relative to the base 12. The screw-type drive assembly includes an internally-threaded upper sleeve 140 that threadingly engages an externally-threaded lower sleeve 142 such that the upper sleeve 140 may be moved upwardly or downwardly relative to the base 1412 by rotating the upper sleeve 140.

As shown in FIG. 20, the adaptor 84 of the adjustment assembly 1442 includes an upper shaft 90 that is secured to the rotating disk 432 of the cutting assembly 416, and a lower shaft 92 that is rotatively coupled to the upper sleeve 140 of the lift device 86. In that way, the adaptor 84 (and hence the cutting assembly) is permitted to rotate relative to the upper sleeve 140. The lower shaft 92 is fixed axially relative to the upper sleeve 140 such that upward and downward movement of the upper sleeve 140 of the lift device 86 causes upward and downward movement of the lower shaft 92 of the adaptor 84. When the adaptor 84 is assembled and the cutting assembly 416 is secured thereto, the upward and downward movement of the upper sleeve 140 is thereby translated to the cutting assembly 416 such that the rotating disk 432 slides relative to the cutting blade 30 to change the cutting thickness of the cutting assembly 416.

The gear assembly 1488 of the adjustment assembly 1442 includes a guide gear 1492 that is positioned on a top surface 1494 of the base 1412. The upper sleeve 140 of the lift device 86 is moveably coupled to the guide gear 1492. Like the embodiment of FIGS. 1-6, rotation of the guide gear 1492 causes rotation of the upper sleeve 140 relative to the lower sleeve 142, which results in the sleeve 140 translating upwardly or downwardly relative to the base 1412.

The guide gear 1492 has a body 1496 rotatively coupled to the base 1412. The body 1496 has a plurality of teeth 1498 defined on an outer surface thereof. A number of the teeth 1498 of the guide gear 1492 are interdigitated with a number of the teeth of the bowl 1420 when the bowl 1420 is positioned on the base 1412 such that rotation of the bowl 1420 causes rotation of the guide gear 1492.

In use, a user may position the bowl 1420 over the output shaft 50 and advance the bowl 1420 into contact with the base 1412. The teeth of the bowl 1420 mesh with the teeth 1498 of the guide gear 1492. The user may grasp the bowl handle (not shown) and rotate the bowl 1420 about the axis 1422. As the bowl 1420 is rotated, the guide gear 1492 is rotated. As described above, rotation of the guide gear 1492 causes downward movement of the upper sleeve 140 and hence movement of the rotating disk 432 relative to the cutting blade 30.

A user may operate the controls 18 to energize the motor 14 to rotate the output shaft 50. Because the cutting assembly 416 is secured the output shaft 50 via the drive stem 452, rotation of the output shaft 50 causes rotation of the cutting assembly. While the motor 14 is energized, the user may advance food items into the processing chamber 26 to be cut by the rotating cutting assembly 416. While the cutting assembly 416 is driven by the motor 14, the user may rotate the bowl 1420 to move the rotating disk 432 relative to the cutting blade 30, thereby changing the cutting thickness of the cutting assembly 416.

It should be appreciated that the food processor 1410 or any of the food processors described above may include a locking mechanism configured to inhibit movement of the bowl relative to the base and thereby maintain the cutting assembly at a particular cutting position. It should also be appreciated that the gear assembly may include other gear arrangements to translate the rotation of the bowl into movement of the rotating disk or the cutting blade to adjust the cutting thickness of the cutting assembly.

Additionally, as described above, the adjustment assemblies may include electromechanical components such that the user may adjust the cutting thickness at the touch of a button while the cutting assembly is driven by the motor. It should therefore be appreciated that any of the embodiments described above in which the user manually adjusts the cutting thickness of the cutting assembly (e.g., the embodiments of FIGS. 1-6 and 8-20) may be modified to include electronic means such as, for example, an electronic motor or other electromechanical device, that change the cutting thickness of the cutting assembly in response to the user pressing a button or interacting with another control. In such embodiments, a motor may provide a force which acts on the adjustment assemblies described above to change the cutting thickness. As described above, it should be appreciated that the addition of such electronic components may require additional controls or buttons, such as, for example, a keypad, to control the operation of the additional electronic components.

There are a plurality of advantages of the present disclosure arising from the various features of the method, apparatus, and system described herein. It will be noted that another embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor comprising:
   a base having a motor positioned therein,
   a bowl removably coupled to the base, the bowl being configured to rotate relative to the base about an axis,
   a lid removably coupled to the bowl so as to define a processing chamber, the lid having a feed tube that opens into the bowl,
   a cutting assembly positioned in the processing chamber and driven by the motor to cut food items advanced through the feed tube, the cutting assembly including a cutting blade and a rotating disk having an upper surface, the rotating disk being moveable relative to the cutting blade to adjust a distance defined between the upper surface of the rotating disk and the cutting blade, and an adjustment assembly positioned in the base, the adjustment assembly being operable to move the rotating disk relative to the cutting blade while the cutting assembly is driven by the motor, wherein the bowl is configured to engage the adjustment assembly such that (i) rotation of the bowl in a first direction about the axis causes upward movement of the rotating disk relative to the cutting blade, and (ii) rotation of the bowl in a second direction causes downward movement of the rotating disk relative to the cutting blade.

2. The food processor of claim 1, wherein the adjustment assembly comprises:

an adaptor coupled to the rotating disk, a sleeve rotatively coupled to the adaptor and to the base, and a gear assembly positioned in the base, the gear assembly being configured to translate rotation of the bowl into rotation of the sleeve, wherein rotation of the sleeve causes movement of the rotating disk relative to the cutting blade.

3. The food processor of claim 2, wherein the sleeve has a groove defined therein, and the gear assembly comprises:

(i) a first gear including a first plurality of teeth defined on an outer surface and a spline extending from an inner surface, the spline being received in the groove of the sleeve such that rotation of the first gear causes rotation of the sleeve, and (ii) a second gear including a second plurality of teeth interdigitated with the first plurality of teeth such that rotation of the second gear causes rotation of the first gear.

4. The food processor of claim 3, wherein the bowl includes a third plurality of teeth that are interdigitated with a number of the second plurality of teeth of the second gear such that rotation of the bowl about the axis causes rotation of the second gear.

5. The food processor of claim 4, wherein the bowl includes an inner wall and an arm extending inwardly from the inner wall to a first end, the first end of the arm having the third plurality of teeth defined thereon.

6. The food processor of claim 5, wherein the base has a slot defined therein sized to receive the first end of the arm.

7. The food processor of claim 6, wherein the slot includes a first section in which the bowl is engaged with the adjustment assembly and a second section in which the bowl is disengaged with the adjustment assembly.

8. The food processor of claim 2, further comprising a drive shaft configured to transmit a driving force from the motor to the cutting assembly, wherein the drive shaft extends through an opening defined in the sleeve, the opening being sized such that the sleeve is spaced apart from the drive shaft.

9. The food processor of claim 8, further comprising a drive stem coupled to the drive shaft, wherein (i) the cutting assembly further includes a blade carrier having the cutting blade secured thereto, and (ii) the drive stem has a keyed end that is received in a corresponding socket defined in the blade carrier.

10. The food processor of claim 9, wherein the lid includes a sleeve that contacts an upper end of the blade carrier to position the blade carrier on the drive stem.

11. The food processor of claim 1, further comprising a locking mechanism configured to inhibit rotation of the bowl about the axis.

12. The food processor of claim 11, wherein the locking mechanism includes (i) a pin extending from a lower surface of the bowl, and (ii) a plurality of notches defined in an upper surface of base, each notch being sized to receive the pin of the bowl.

13. A food processor comprising:

a base having a motor positioned therein, a bowl removably coupled to the base, the bowl being configured to rotate relative to the base about an axis, a lid removably coupled to the bowl so as to define a processing chamber, the lid having a feed tube that opens into the bowl, a cutting assembly positioned in the processing chamber and driven by the motor to cut food items advanced through the feed tube, the cutting assembly being positionable between a plurality of cutting positions to produce cut food items of varying thicknesses, and an adjustment assembly attached to the base, the adjustment assembly being operable to move the cutting assembly between the plurality of cutting positions while the cutting assembly is driven by the motor, wherein the bowl is configured to engage the adjustment assembly such that rotation of the bowl about the axis operates the adjustment assembly to move the cutting assembly between the plurality of cutting positions.

14. The food processor of claim 13, wherein the adjustment assembly comprises:

an adaptor coupled to the cutting assembly, a sleeve rotatively coupled to the adaptor and to the base, and a gear rotatively coupled to the base, the gear being configured to translate rotation of the bowl into rotation of the sleeve, wherein rotation of the sleeve causes movement of the cutting assembly between the plurality of cutting positions.

15. The food processor of claim 14, wherein:

the sleeve has a groove defined therein, the gear includes a first plurality of teeth defined on an outer surface and a spline extending from an inner surface, the spline being received in the groove of the sleeve such that rotation of the gear causes rotation of the sleeve, and the bowl includes a second plurality of teeth that are interdigitated with the first plurality of teeth such that rotation of the bowl causes rotation of the gear.

16. The food processor of claim 14, wherein:

(i) the adaptor includes a first adaptor removably coupled to the cutting assembly, and a second adaptor torsionally secured to a lower end of the first adaptor, and (ii) the sleeve includes a bearing rotatively supporting the second adaptor.

17. The food processor of claim 16, wherein the lower end of the first adaptor includes a first plurality of teeth, and the second adaptor includes a second plurality of teeth interdigitated with the first plurality of teeth to torsionally secure the second adaptor to the first adaptor.

18. The food processor of claim 14, wherein:

(i) the gear is a first gear moveably coupled to the sleeve such that rotation of the first gear causes rotation of the sleeve, the first gear including a first plurality of teeth, and (ii) the adjustment assembly further comprises a second gear including a second plurality of teeth interdigitated with the first plurality of teeth such that rotation of the second gear causes rotation of the first gear.

19. The food processor of claim 18, wherein the bowl includes an inner wall and an arm extending inwardly from the inner wall to a first end, the first end of the arm having a third plurality of teeth defined thereon that are interdigitated with the second plurality of teeth of the second gear such that rotation of the bowl about the axis causes rotation of the second gear.

20. A food processor comprising:

a base having a motor positioned therein, a bowl removably coupled to the base, the bowl being configured to rotate about an axis relative to the base, a lid removably coupled to the bowl so as to define a processing chamber, the lid having a feed tube that opens into the bowl, a cutting assembly positioned in the processing chamber and driven by the motor to cut food items advanced through the feed tube, the cutting assembly being positionable between a plurality of cutting positions to produce cut food items of varying thicknesses, and an adjustment assembly comprising a gear assembly positioned in the base and operable to move the cutting assembly between the plurality of cutting positions while the cutting assembly is driven by the motor, wherein the bowl is configured to engage the gear assembly such that rotation of the bowl about the axis relative to the base operates the adjustment assembly to move the cutting assembly between the plurality of cutting positions.

* * * * *